(12) United States Patent
Kumacheva

(10) Patent No.: US 8,476,382 B2
(45) Date of Patent: Jul. 2, 2013

(54) MULTIPLE CONTINUOUS MICROFLUIDIC REACTORS FOR THE SCALED UP SYNTHESIS OF GEL OR POLYMER PARTICLES

(76) Inventor: Eugenia Kumacheva, Toronto (CA)

( * ) Notice: Subject to any disclaimer, the term of this patent is extended or adjusted under 35 U.S.C. 154(b) by 676 days.

(21) Appl. No.: 12/451,886

(22) PCT Filed: Jun. 5, 2008

(86) PCT No.: PCT/CA2008/001073
§ 371 (c)(1),
(2), (4) Date: Mar. 17, 2010

(87) PCT Pub. No.: WO2008/148200
PCT Pub. Date: Dec. 11, 2008

(65) Prior Publication Data
US 2010/0184928 A1   Jul. 22, 2010

Related U.S. Application Data

(60) Provisional application No. 60/924,921, filed on Jun. 5, 2007.

(51) Int. Cl.
*C08F 2/01* (2006.01)
*B01J 19/24* (2006.01)
*B01J 4/00* (2006.01)
*C08F 2/04* (2006.01)

(52) U.S. Cl.
USPC ............... 526/65; 526/88; 526/920; 422/130; 422/134; 422/602; 422/603; 137/806; 137/833

(58) Field of Classification Search
USPC .................. 422/130, 602, 603, 134; 137/806, 137/833; 526/88, 65, 920
See application file for complete search history.

(56) References Cited

U.S. PATENT DOCUMENTS

| | | | |
|---|---|---|---|
| 5,993,750 A * | 11/1999 | Ghosh et al. | 422/603 |
| 7,927,550 B2 * | 4/2011 | Baeuerle et al. | 422/113 |
| 2002/0023684 A1 * | 2/2002 | Chow | 137/833 |

FOREIGN PATENT DOCUMENTS

| | | |
|---|---|---|
| CA | 2491564 | 1/2004 |
| CA | 2563836 | 11/2005 |

* cited by examiner

*Primary Examiner* — Fred M Teskin
(74) *Attorney, Agent, or Firm* — Hill & Schumacher

(57) ABSTRACT

This present invention provides devices for the parallelization of the formation of droplets in a multiple droplet generator integrating two or more parallel flow-focusing devices (FFDs) with either identical, or different, geometries. In the parallel identical FFDs, emulsification generates droplets with a narrow (below 4%) polydispersity despite weak coupling between the identical flow-focusing devices. Formation of droplets in the integrated droplet generator comprising FFDs with different dimensions of the microchannels occurs with strong coupling between the FFDs and produces droplets with varying sizes and size distributions. For such devices the regime in which emulsification produces droplets with varying dimensions and a narrow size distribution have been identified. The results of this work can be used in scaling up the production of droplets and in the simultaneous production of droplets and particles with different dimensions.

18 Claims, 14 Drawing Sheets

MULTIPLE CONTINUOUS MICROFLUIDIC REACTORS FOR THE SCALED UP SYNTHESIS OF GEL OR POLYMER PARTICLES

CROSS REFERENCE TO RELATED U.S. APPLICATIONS

This patent application is a National Phase application claiming the benefit of PCT/CA2008/001073 filed on Jun. 5, 2008; which further claims the priority benefit from, U.S. Provisional Patent Application Ser. No. 60/924,921 filed on Jun. 5, 2007, in English, entitled MULTIPLE CONTINUOUS MICROFLUIDIC REACTORS FOR THE SCALED UP SYNTHESIS OF POLYMER PARTICLES, and which is incorporated herein by reference in its entirety.

FIELD OF THE INVENTION

The present invention relates to microfluidic reactors for parallel scaled up synthesis in droplets and methods of use. The microfluidic devices include multiple parallel flow-focusing droplet generators with an individual inlet and outlet and an integrated microfluidic reactor.

BACKGROUND OF THE INVENTION

Microfluidics is the science and technology of systems that process or manipulate small ($10^{-9}$ to $10^{-8}$ L) amounts of fluids, using channels with dimensions of tens to hundreds of micrometers (see G. M. Whitesides. *Nature* 442, 368 (2006)). Over the last decade, a broad range of applications of microfluidics has been developed that included bioanalyses, syntheses of organic, inorganic, and bioorganic compounds, and the screening of conditions for protein crystallization.

Recently, microfluidic syntheses of polymer particles with controllable dimensions, shapes, and structures have attracted significant industrial interest. Potential applications of the microreaction technology include the production of ion exchange resins, calibration standards, spacers for electrochromic windows, microbeads for chromatography and biomedical purposes, and for the encapsulation of liquid ingredients. Currently, the productivity of a single microfluidic reactor is on the order of grams/hour. It is unlikely that without a significant increase in the productivity of microfluidic reactors this technology will ever find major industrial applications.

Recently, microfluidic emulsification allowed for the generation of droplets with precisely controlled compositions, morphologies, and volumes. Synthesis performed in these droplets has attracted great interest in materials and polymer science, and proved useful in the chemical, pharmaceutical, food, nutrition, and cosmetics fields. Miniaturization of continuous chemical reactions by compartmentalizing them in droplets provided efficient heat and mass transfer, precise control of the timing of reactions, and the ability to synthesize and transport gaseous, liquid and solid reagents and products (see H. Song; D. L. Chen; R. F. Ismagilov. *Angew. Chem., Int. Ed.* 45, 7336 (2006)). The use of these droplets as microreactors has generated a rapidly growing field of research and led to a number of new technology platforms (see H. Song; D. L. Chen; R. F. Ismagilov. *Angew. Chem., Int. Ed.* 45, 7336 (2006); M. Seo; S. Xu; Z. Nie; P. C. Lewis; R. Graham; M. Mok; E. Kumacheva. *Langmuir* 21, 4773 (2005); and A. Gunther, K F. Jensen. *Lab Chip* 6, 1487 (2006)).

Presently, applications of droplets produced by means of microfluidics can be tentatively categorized in two groups, namely, "discovery" and "development." The first group of applications aims at studies of fast reactions and processes in e.g., drug discovery, gene expression analysis, bioassays, and the optimization of formulations for chemical synthesis. These applications generally require reactions to be performed on a microscale, since reagents are generally expensive or are only available in limited amounts. The second group of applications embraces microfluidic synthesis and fabrication of new materials with specific and sometimes, unique properties. Examples of such materials include silica colloids, microgel capsules, and polymer particles with specific morphologies (see Whitesides, G. M., Stone, H. A. *Angew. Chemie, Intnl. Ed.* 44, 724 (2005); (b) D. Dendukuri, K. Tsoi, T. A. Hatton and P. S. Doyle, *Langmuir* 21, 2113 (2005); S. A. Khan, A. Gunther, M. A. Schmidt, and K. F. Jensen, *Langmuir* 20, 8604 (2004); and (a) A. S. Utada, E. Lorenceau, D. R. Link, P. D. Kaplan, H. A. Stone, and D. A. Weitz, *Science* 2005, 308, 537 (2005); (b) Nie, Z.; Xu, S.; Seo, M.; Lewis P. C., Kumacheva, E. *J. Amer. Chem. Soc.* 127, 8058 (2005)).

Both groups of applications require multiple reactions and processes to be performed in parallel. For the second group, this requirement is vital: future progress in the development and production of new materials by microfluidic synthesis will be determined by the ability to scale up their production in multiple parallel continuous processes.

Currently, two groups of conventional technologies are used for the production of polymer colloids in the range from tens to hundreds of micrometers. In the first group, namely suspension polymerization methods, polymer particles are obtained by polymerizing monomer droplets that comprise oil-soluble initiators (see E. Vivaldo-Lima, P. E. Wood, A. E. Hamielec *Ind. Eng. Chem. Res.*, 36, 939 (1997)). Droplets are produced by emulsifying liquid monomers in an aqueous phase in the presence of a stabilizing agent. Typically, particles obtained by suspension polymerization have a broad range of sizes, due to the insufficient control of the emulsification process and coalescence of droplets during their transportation to the reactor and in the course of polymerization. Generally, when a narrower distribution of sizes is required, the microbeads are fractionated. This time-consuming process leads to the loss of material. Although, membrane emulsification enhances droplet size distribution, coalescence of droplets in the course of polymerization still results in a broadened size distribution of the resulting particles (see G.-H. Ma, H. Sone, S. Omi. *Macromolecules* 37, 2954 (2004).

The second group, is referred to as the multi-step swelling method (the Ugelstadt method, see (a) J. Ugelstad, K. H. Kaggerud, F. K. Hansen, A. Berge. *Macromol. Comm.* 180, 737 (1979); (b) J. Ugelstad, L. Söderberg, A. Berge, I. Bergström, *Nature* 303, 95 (1983)). This time-consuming process involves the synthesis of small "precursor" particles that are used as seeds for the multi-stage synthesis of larger microbeads. When a monomer is added to the dispersion of precursor particles, it partitions and swells the seed particles. Subsequent polymerization of the swollen beads yields particles with an incremental increase in size. In order to obtain particles with dimensions exceeding 50 μm, the procedure is repeated several times.

At present, the microfluidic production of polymer particles includes (i) microfluidic emulsification of monomers or liquid pre-polymers and (ii) in-situ hardening of droplets by on-chip free-radical or condensation polymerization. In contrast with conventional suspension polymerization, microfluidic synthesis in an individual microreactor produces particles with an extremely narrow size distribution, due to the specific mechanisms of microfluidic emulsification and continuous "on-chip" polymerization of the droplets that prevents droplet coalescence. In addition, microfluidic polymerization yields particles with a range of precisely controlled shapes and morphologies.

A single microfluidic droplet generator typically has a productivity in the range from $10^3$ to $10^6$ droplets/hour, which corresponds to the productivity in particle synthesis. In order to favorably compete with conventional polymerization strategies, the generation of droplets has to be scaled up by producing them in multiple parallel droplet generators. Furthermore, to preserve the advantages of microfluidic emulsification, the droplets obtained in parallel devices should maintain their narrow size distribution.

Scalable polymerization of polymer particles has been reported in sixteen individual microfluidic reactors with eight inlets for the monomer droplet phase and sixteen inlets for the continuous aqueous phase, that were placed in a concentric manner on a single microfluidic chip (T. Nisisako, T. Torii, T. Takahashi, Y. Takizawa, Adv. Mater. 18, 1152-1156 (2006)). Although detailed analysis of the variation in sizes of particles produced in multiple microchannels has not been reported, the authors claimed that polymerization of monomer droplets yielded up to 20 g h$^{-1}$ of particles with polydispersity 3%. This device requires multiple (at least 16) syringe pumps to supply two liquids to each microfluidic such that such a system is quite expensive.

The challenge in the scaled up microfluidic synthesis of polymer particles in multichannel microfluidic reactors is to preserve the advantages of synthesis in a single-channel microfluidic reactor: a narrow size distribution and controllable structure of particles, arising from the highly controlled microfluidic emulsification and the high conversion of monomers, without a significant increase in the microreactor dimensions and the use of multiple pumps supplying liquids to each microreactor. The last two requirements can be satisfied requirements in a combined microfluidic reactor with two inlets for the droplet and continuous phases.

Multichannel microfluidic devices have been used for DNA separation, parallel PCR assays, detection of enzymatically-generated fluorescence and linear temperature gradients, capillary electrophoresis for immunoassays, and chiral separation (see Zheng, B.; Ismagilov, R. F. Angew. Chem., Int. Ed. 2005, 44, 2520; J. S. Marcus, W. F. Anderson, and S. R. Quake, Anal. Chem., 2006, 78, 956, A. T. Woolley, G. Sensabaugh, and R. A. Mathies, Anal. Chem., 1997, 69, 2181; Y. Shi, P. C. Simpson, J. R. Scherer, D. Wexler, C. Skibola, M. T. Smith, and R. A. Mathies, Anal. Chem. 1999, 71, 5354; H. Mao, T. Yang, and P. S. Cremer, J. Am. Chem. Soc., 2002, 124, 4432; M. Herrmann, T. Veres, and M. Tabrizian, Lab Chip, 2006, 6, 555; Y. Gao, Z. Shen, H. Wang, Z. Dai, and B. Lin, Electrophoresis, 2005, 26, 4774; S. B. Cheng, C. Skinner, J. Taylor, S. Attiya, W. E. Lee, G. Picelli, and D. J. Harrison, Anal. Chem., 2001, 73, 1472).

In these reports, emulsification in parallel combined microfluidic channels was not used. Typically, implementation of multiple droplet generators on a planar microfluidic chip entails experimental challenges such as an easy supply of liquids, realization of identical geometries of individual droplet generators, and controlled and reproducible flow rates of liquids in microchannels. Recently, several approaches to the production of droplets or plugs with identical or alternating composition were proposed that employed break up of liquid plugs at T-junctions, geometrically mediated breakup of droplets and flow-focusing devices placed in a series (see V. Barbier, H. Willaime, and P. Tabeling, Phys. Rev. E, 2006, 74, 046306; 26. B. Zheng, J. D. Tice and R. F. Ismagilov, Anal. Chem., 2004, 76, 4977; B. Zheng, L. S. Roach and R. F. Ismagilov, J. Am. Chem. Soc., 2003, 125, 11170; D. N. Adamson, D. M, John, X. J. Zhang, B. Zheng, and R. F. Ismagilov, Lab Chip, 2006, 6, 1178; D. R. Link, S. L. Anna, D. A. Weitz, and H. A. Stone, Phys. Rev. Lett., 2004, 92, 054503; P. Garstecki, M. J. Fuerstman, H. A. Stone, and G. M. Whitesides, Lab Chip, 2006, 6, 437; P. Garstecki, M. J. Fuerstman and G. M. Whitesides, Nat. Phys., 2005, 1, 168; H. Song, J. D. Tice and R. F. Ismagilov, Angew. Chem. Int. Ed., 2003, 42, 768).

To date, a single report exists on the synchronization of formation of droplets in the device comprising two parallel combined microfluidic droplet generators with T-junctions with two inlets (see V. Barbier, H. Willaime, P. Tabeling. Phys. Rev. E 74, 046306 (2006)). The authors showed the broadening in droplet size distribution due to the parametric coupling between the individual devices, and, found that a narrow polydispersity of the droplets was achieved when emulsification in the two microchannels was synchronized.

In comparison with formation of droplets at T-junctions, the flow-focusing mechanism used in the present invention discussed hereinafter has higher emulsification efficiency and allows better control over droplet size and size distribution. It is also not obvious whether the results obtained in two droplet generators can be projected to the muff/channel device with combined microchannels; with an increasing number of microchannels, the requirement for synchronization between them may become problematic.

In addition to the scaled up synthesis of polymer particles, emulsification in parallel droplet generators is also important in fast-throughput screening of the effect of a particular event or variable in a chemical or physical process, e.g., in optimization of conditions of chemical reactions or in studies of the effect of the surface energy and geometry of the microfluidic device on the formation of droplets.

SUMMARY OF THE INVENTION

This present invention provides multiple continuous microfluidic reactors for parallel scaled up synthesis in polymer particles, and methods of use thereof. The requirements of such synthesis include a high conversion (up to 98%) of monomer to polymer and the production of microbeads in the diameter in the range from 10 to 500 µm that also have a narrow size distribution and a well-defined structure.

Accordingly, the present invention provides embodiments of a multiple microfluidic droplet generator containing two or more parallel flow-focusing devices (FFDs), with a single overall inlet branching into multiple inlets associated with each of the flow-focusing devices depending on the number of FFDs in the generator, and a single outlet. Upon using FFDs with an identical design, the production of droplets is scaled up and the variation in their size distribution is examined, in comparison with droplets formed in a single droplet generator. Using the FFDs with distinct geometries we simultaneously generate several populations of droplets with different volumes, yet a narrow size distribution. The results of this work can be used in parallelization (scaling up) of the production of droplets, as well as in simultaneous production of polymer particles with different dimensions and fast throughput screening of the effect of droplet volume on polymerization reactions.

Droplets produced in the multiple parallel droplet generators are used for chemical reactions. Activation of reactions occurs by applying heat, irradiation, electric or magnetic fields. For example, photoinitiated polymerization of monomers is triggered by irradiating droplets with UV-light. For monomers undergoing fast polymerization, e.g., multifunctional acrylates, continuous polymerization is conducted on-chip in the integrated extension channel, as shown in FIG. 11 for an individual microfluidic reactor. For monomers undergoing slow polymerization such as styrene in situ pre-polymerization is followed by post-polymerization in the of-chip additional extension channel (FIG. 11). For such polymers, the rate of polymerization is additionally increased by using a mixed initiator approach: a monomer is mixed with a thermoinitiator and photoinitiator. Exothermic photopolymerization generates heat which triggers thermoinitiated polymerization thereby increasing monomer conversion.

Thus, in one aspect of the present invention there is provided multiple microfluidic reactor for scaled up synthesis in emulsion droplets, comprising:
 a) a first base sheet having a planar top surface;
 b) a second sheet having:
  i) relief patterns of a plurality of microfluidic flow-focusing devices, each including an inlet and an outlet,
  ii) a relief pattern for a first inlet manifold distributor having a fluid inlet and microfluidic flow channels each in fluid communication with the first manifold fluid inlet and the inlets of the plurality of microfluidic flow-focusing devices,
  iii) a relief pattern for an outlet manifold distributor connected to the outlets of the plurality of microfluidic flow-focusing devices, the outlet manifold distributor having a fluid outlet,
  iv) said relief patterns being formed in a bottom surface of the second sheet,
  v) each of said plurality of microfluidic flow-focusing devices having an opening in the top surface of the second sheet in flow communication with an interior of the associated microfluidic flow-focusing device; and
 c) at least a third sheet having a relief pattern of a second inlet manifold distributor in a bottom surface of said third sheet, the relief pattern of the second inlet manifold distributor including an inlet and a plurality of microfluidic flow channels each in fluid communication with the second manifold fluid inlet and with one of said openings in the top surface of the second sheet when said third sheet is assembled on a top surface of the second sheet with the bottom surface in physical contact with the planar top surface in sealing relationship, and wherein assembling the second sheet on the planar top surface of the first base sheet with the bottom surface in physical contact with the planar top surface in sealing relationship forms the plurality of microfluidic flow-focusing devices and the first inlet and outlet manifold distributors; and
 d) wherein in operation two immiscible liquids, a droplet phase, A, and a continuous phase, B, are supplied to the first manifold fluid inlet and to the second manifold fluid inlet respectively, and wherein said two immiscible liquids A and B are forced through a narrow orifice in which a thread of liquid A breaks up and produces emulsion droplets.

In another aspect of the present invention there is provided a method for producing emulsion droplets, comprising the steps of:
 a) providing a multiple microfluidic reactor for scaled up synthesis in emulsion droplets, comprising:
  i) a first base sheet having a planar top surface;
  ii) a second sheet having relief patterns of a plurality of microfluidic flow-focusing devices, each including an inlet and an outlet, a relief pattern for a first inlet manifold distributor having a fluid inlet and microfluidic flow channels each in communication with the first manifold fluid inlet and the inlets of the plurality of microfluidic flow-focusing devices, the first inlet manifold distributor having a fluid inlet, a relief pattern for an outlet manifold distributor connected to the outlets of the plurality of microfluidic flow-focusing devices, the outlet manifold distributor having a fluid outlet, said relief patterns being formed in a bottom surface of the second sheet, each of said plurality of microfluidic flow-focusing devices having an opening in the top surface of the second sheet in flow communication with an interior of the associated microfluidic flow-focusing device; and
  iii) at least a third sheet having a relief pattern of a second inlet manifold distributor in a bottom surface of said third sheet, the relief pattern of the second inlet manifold distributor including a plurality of microfluidic flow channels each in fluid communication with a second manifold fluid inlet and one of said openings in the top surface of the second sheet when said third sheet is assembled on a top surface of the second sheet with the bottom surface in physical contact with the planar top surface in sealing relationship, and wherein assembling the second sheet on the planar top surface of the first base sheet with the bottom surface in physical contact with the planar top surface in sealing relationship forms the plurality of microfluidic flow-focusing devices and the first inlet and outlet manifold distributors; and
 b) supplying at least two immiscible liquids, a droplet phase, A, and a continuous phase, B, to the first manifold fluid inlet and to the second manifold fluid inlet respectively, and wherein said two immiscible liquids A and B are forced through a narrow orifice in which a thread of liquid A breaks up and produces emulsion droplets.

A further understanding of the functional and advantageous aspects of the invention can be realized by reference to the following detailed description and drawings.

BRIEF DESCRIPTION OF THE DRAWINGS

Embodiments of the present invention are described in greater detail with reference to the accompanying drawings.

Figure 11:
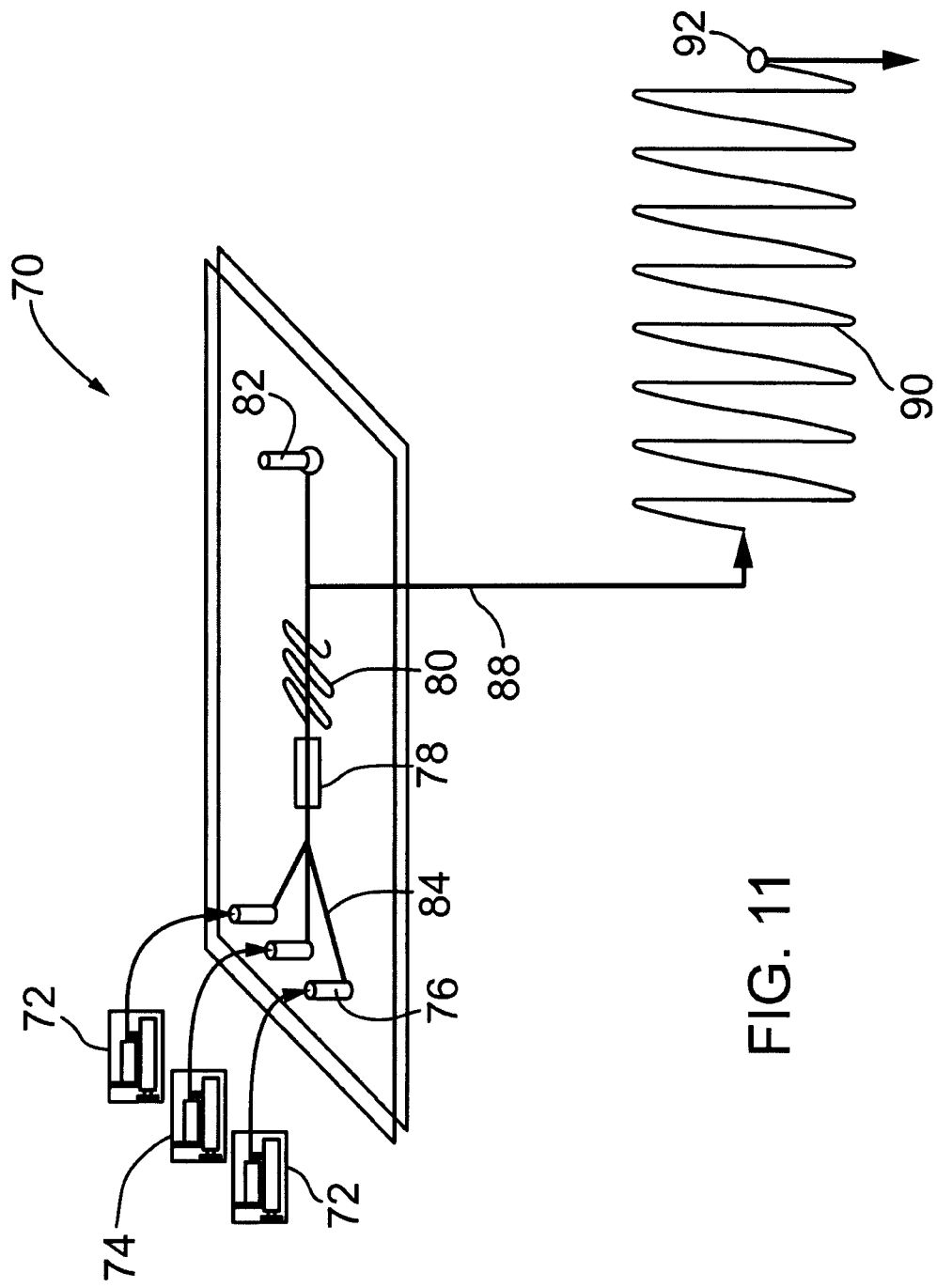
Figure 12A:
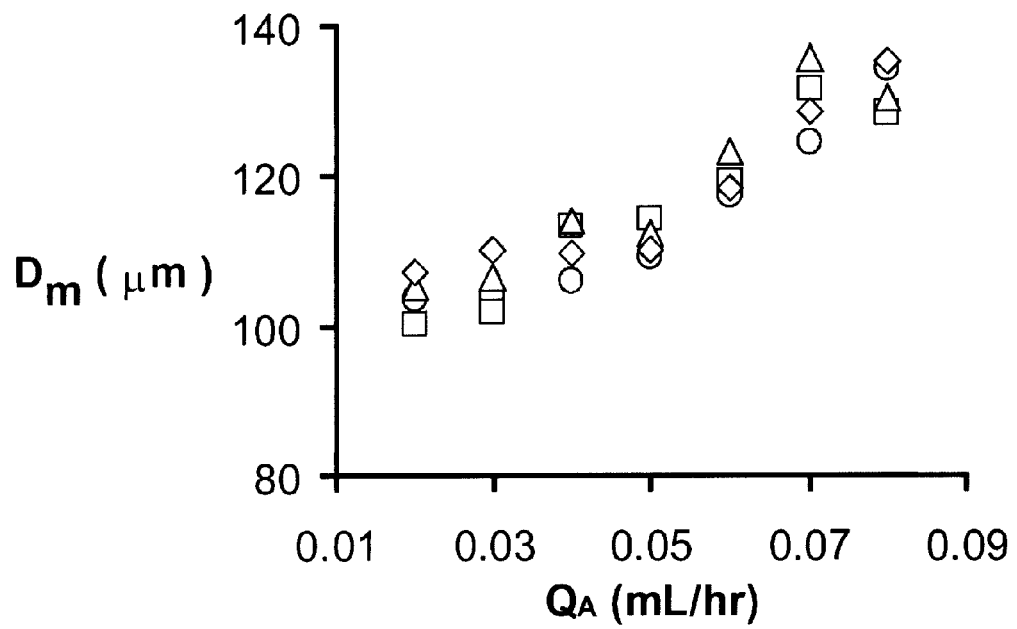
Figure 12B:
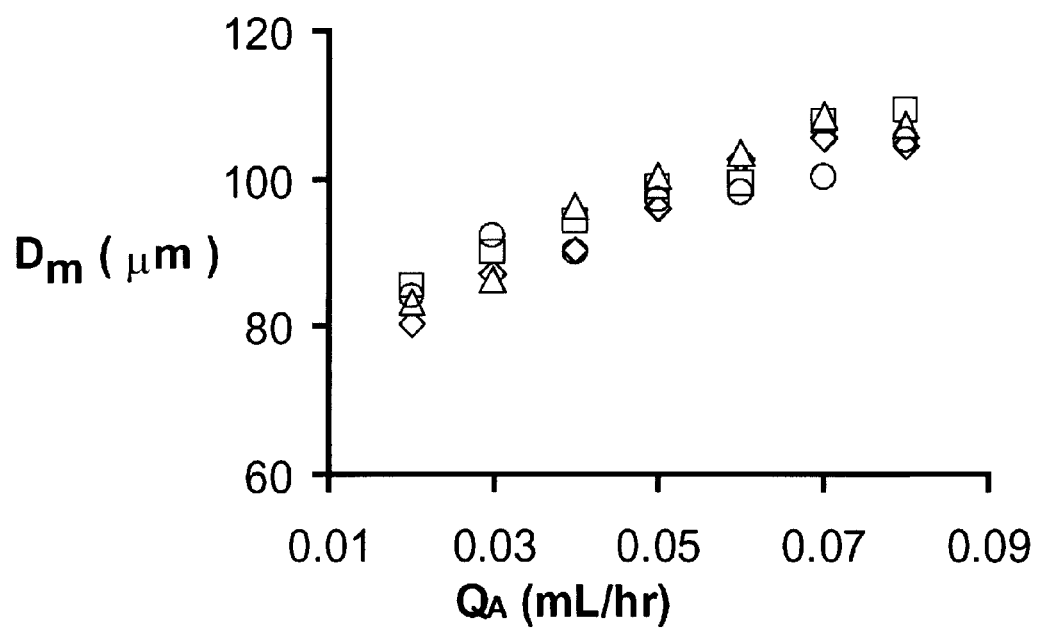

FIG. 11 shows an individual microfluidic polymerization reactor combining emulsification and on-chip polymerization for rapidly polymerizing monomers and on-chip and off-chip polymerization for slowly polymerizing monomers FIGS. 12*a*, 12*b* shows variation in mean diameter of droplets generated in four parallel FFDs, plotted as a function of the flow rate of the droplet phase, $Q_A$, at (12*a*) $Q_B$=1.0 mL/hr and (12*b*) $Q_B$=1.4 mL/hr. $Q_B$ is the flow rate of the continuous phase B supplied to inlet 22

Figure 12C:
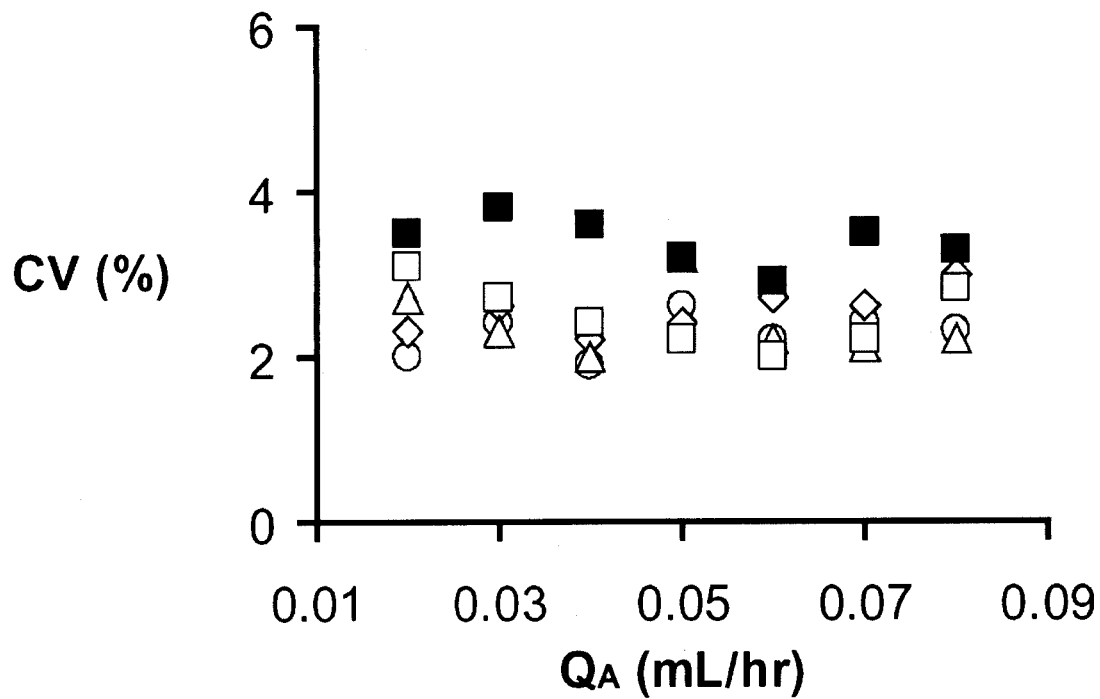
Figure 12D:
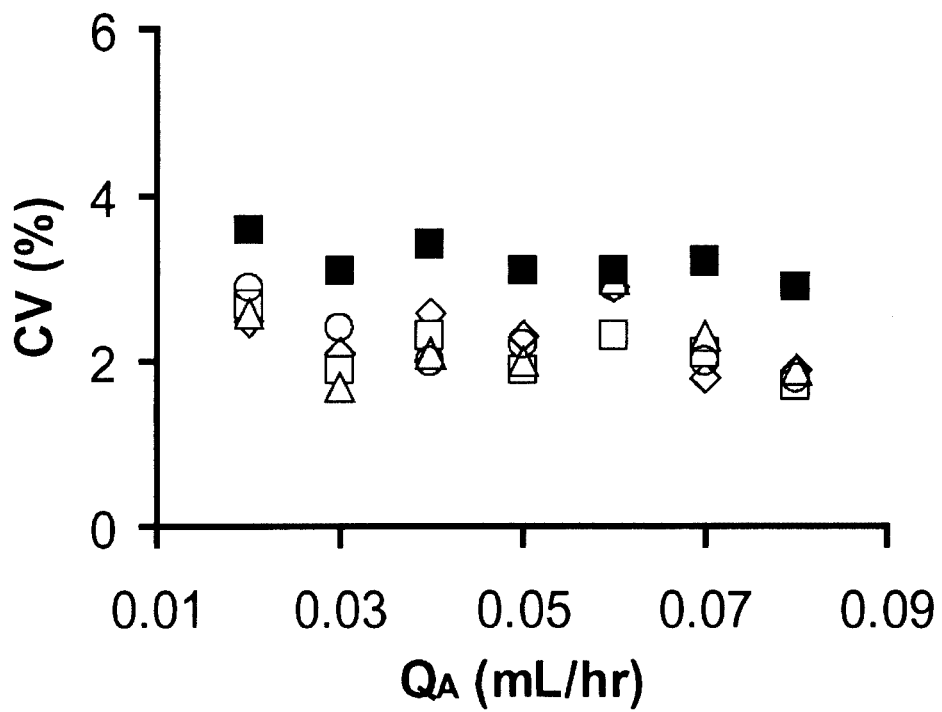

FIGS. 12*c*, 12*d* show variation in polydispersity of droplets produced in individual FFDs and in the quadra-droplet generator (QDG) (■). Orifice width in FFD 101 is 50.7±1.0 μm (◇), FFD 102, 50.8±1.0 μm (□); FFD 103, 48±1.0 μm (Δ) and FFD 104, 48.8±1.0 μm (○).

Figure 13A:
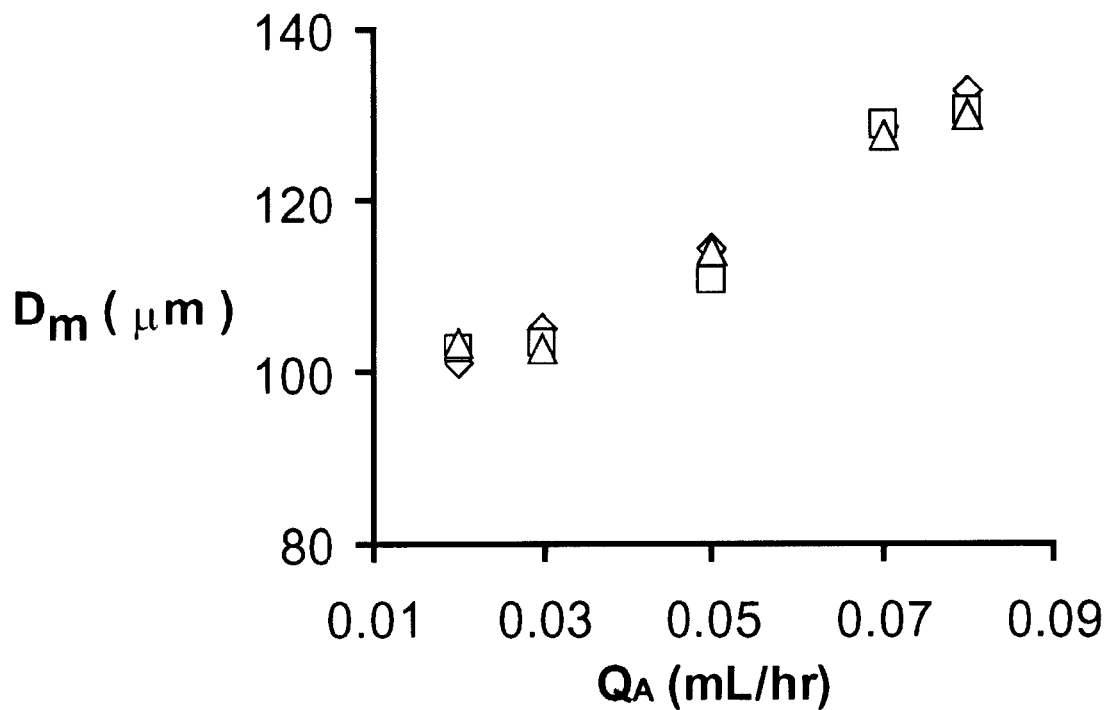
Figure 13B:
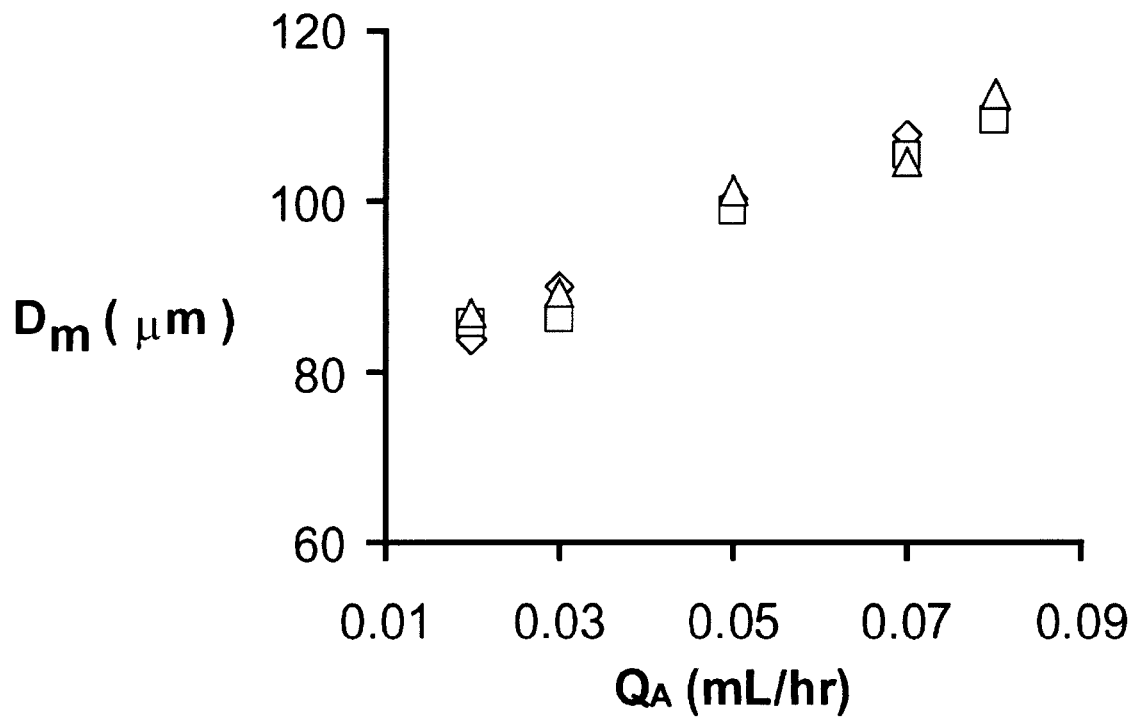

FIGS. 13*a*, 13*b* show variation in mean diameter of droplets generated in FFD 102, plotted as a function of the flow rate, $Q_A$, of the droplet phase at (a): $Q_B$=1.0 mL hr and (b): $Q_B$=1.4 mL/hr. $Q_B$ is the flow rate of the continuous phase B supplied to inlet 22.

Figure 13C:
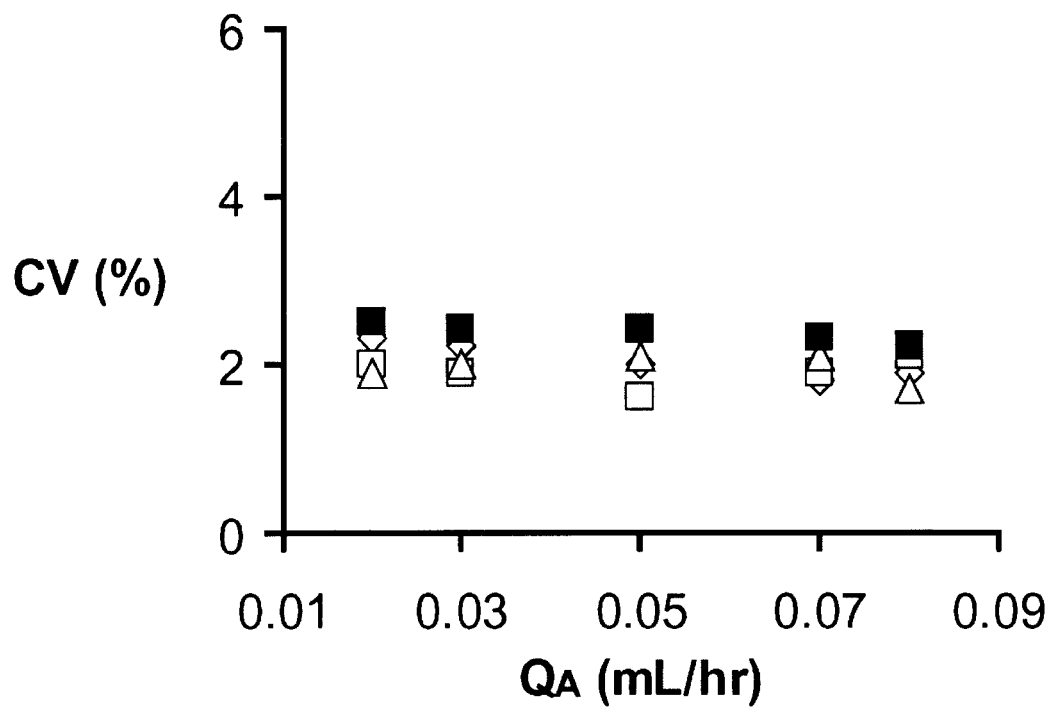
Figure 13D:
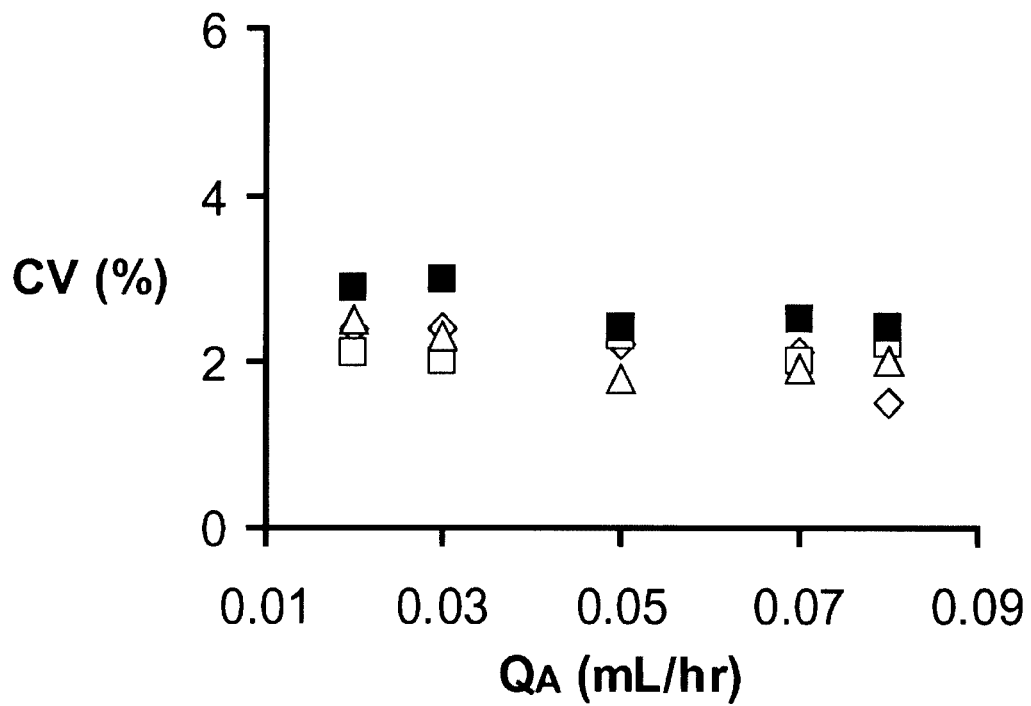

FIGS. 13*c*, 13*d* show variation in polydispersity of droplets produced in FFD 102 in three consecutive emulsification experiments (open symbols) and of the total population of droplets (■). Orifice width of FFD 102: 50.8±1.0 μm.

Figure 14:
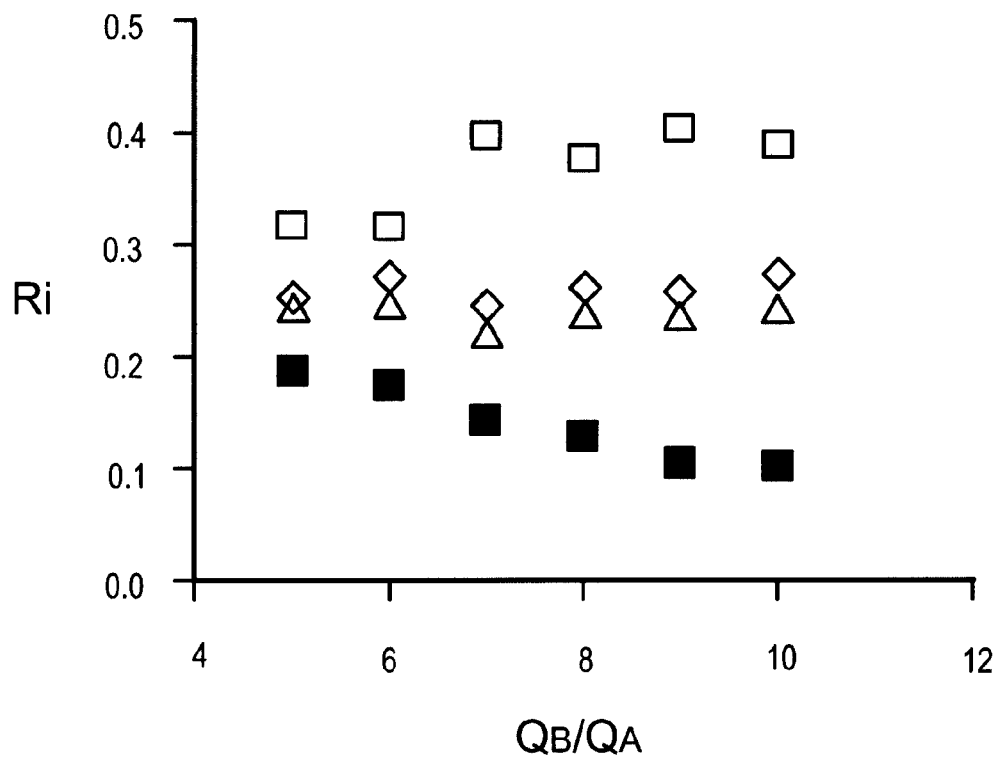

FIG. 14 shows the variation in volume fraction of droplets generated in FFD with different geometry plotted as a function of ratio of flow rates of continuous to droplet phases for FFD 101 (■), FFD 102 (Δ), FFD 103 (◇), and FFD 104 (□).

Figure 15:
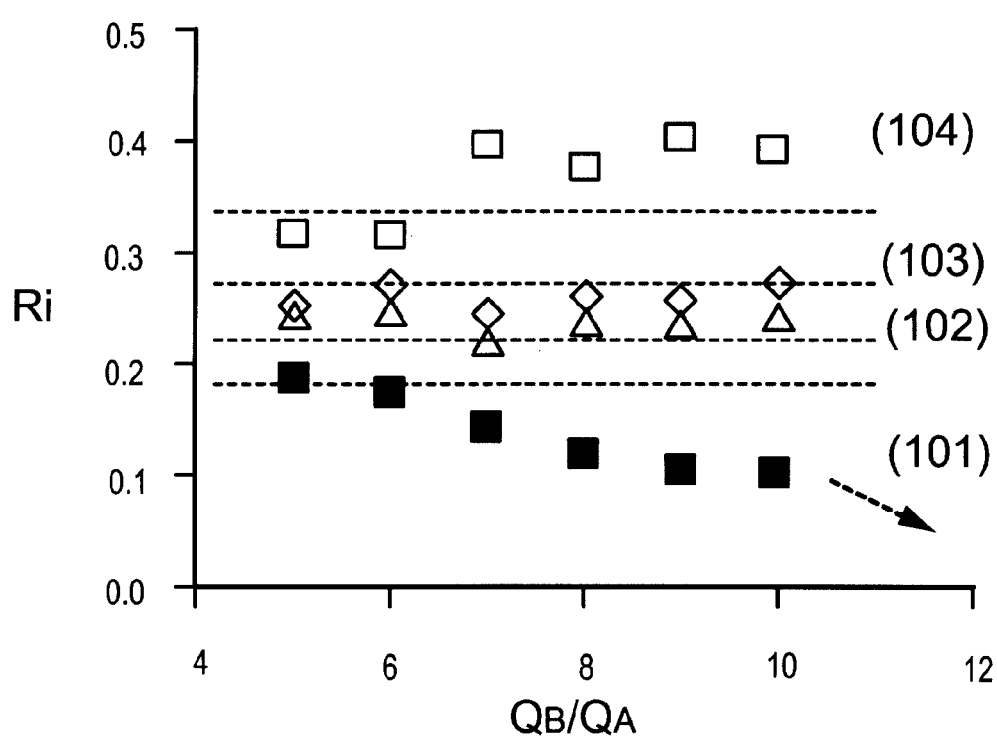

FIG. 15 shows experimentally measured volume fraction of droplets generated in the quadra-droplet generator 10 (QDG) with different geometry plotted as a function of the ratio of flow rates of continuous to droplet phases in the quadra-droplet generator 10 (QDG). The horizontal dashed lines represent the volume fraction of an orifice in an individual FFD to the total volume of orifices in the QDG (bottom to top lines correspond to FFD 101 to FFD 104, respectively).

Figure 16:
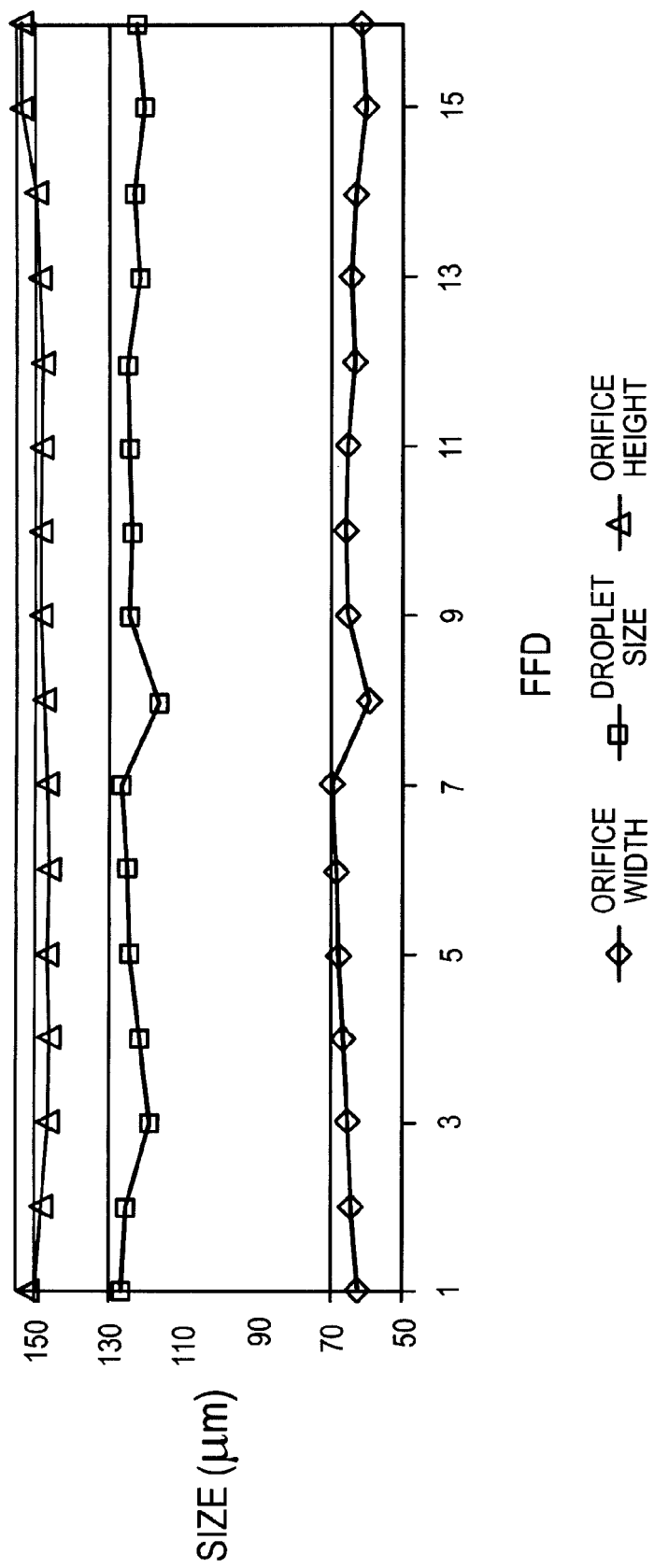

FIG. 16 shows the variation in the droplet size plotted along with the width and height of the orifice in the integrated droplet generator comprising sixteen individual droplet generators 20.

The following reference numbers are incorporated herein to describe elements within the figures. In the quadra-droplet generator (QDG) shown generally at 10,

| | |
|---|---|
| 12 | First sheet |
| 14 | Second sheet |
| 16 | Third Sheet |
| In sheet 14, | |
| 20 | Fluid-focusing device (FFD) |
| 22 | Fluid B inlet |
| 24 | Inlet manifold distributor |
| 26 | Inlet microfluidic flow channels |
| 28 | FFD inlet |
| 30 | Fluid A microchannel inlets to the FFD |
| 32 | Fluid B microchannel inlets to the FFD |
| 34 | Orifice in the FFD |
| 36 | FFD outlet |
| 38 | Outlet microfluidic flow channels from the FFD |
| 40 | Outlet manifold distributor |
| 42 | Openings for fluid A |
| 62 | Fluid A droplets |
| 64 | Fluid outlet |
| In sheet 16, | |
| 52 | Fluid A inlet |
| 54 | Inlet manifold distributor |
| 56 | Inlet microfluidic flow channels |
| In microfluidic polymerization reactor 70 in FIG. 11, | |
| 72 | Pumps for inserting the fluid B |
| 74 | Pump for inserting the fluid A |
| 76 | Fluid inlets |
| 78 | Orifice |
| 80 | Polymerization compartment |
| 82 | First outlet |
| 84 | Microfluidic flow channels |
| 88 | Extension tube |
| 90 | Off-chip polymerization compartment |
| 92 | Second outlet |

Elsewhere, 101, 102, 103, and 104 are four flow-focusing devices 20 (FFDs) in a quadra-droplet generator 10 (QDG) used in experimentation and for demonstrative purposes.

DETAILED DESCRIPTION OF THE INVENTION

Generally speaking, the systems described herein are directed to multiple flow-focusing microfluidic droplet generators. As required, embodiments of the present invention are disclosed herein. However, the disclosed embodiments are merely exemplary, and it should be understood that the invention may be embodied in many various and alternative forms. The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention. For purposes of teaching and not limitation, the illustrated embodiments are directed to multiple flow-focusing microfluidic droplet generators.

As used herein, the term "about", when used in conjunction with ranges of dimensions of particles or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

Figure 1:
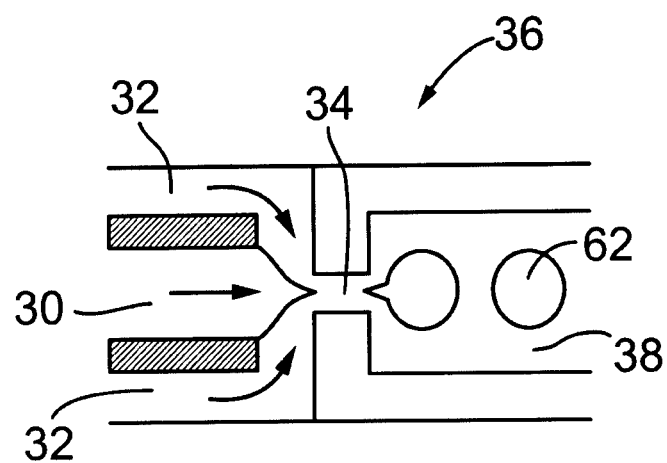
FIG. 1 is a schematic of droplet formation in an individual planar microfluidic flow-focusing droplet generator.
Figure 2:
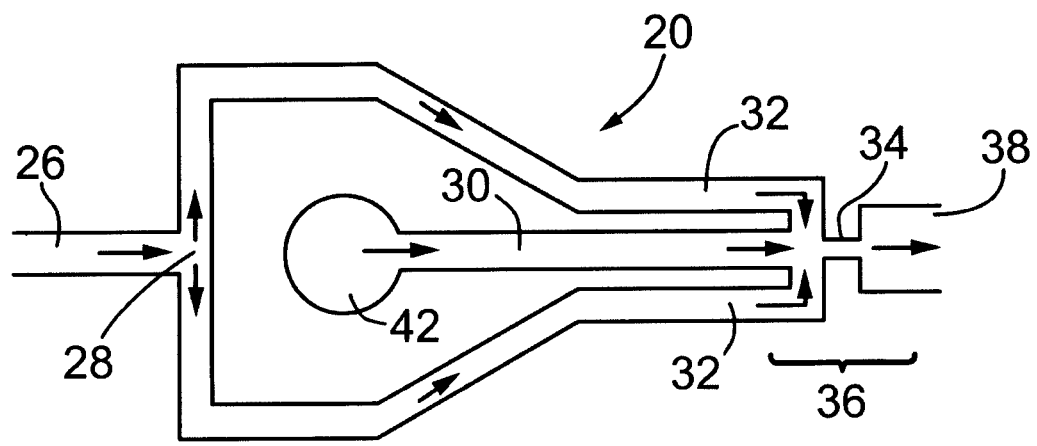
FIG. 2 is a top-view of an individual droplet generator depicting the direction of fluid flow in the microfluidic droplet generator.
Figure 3:
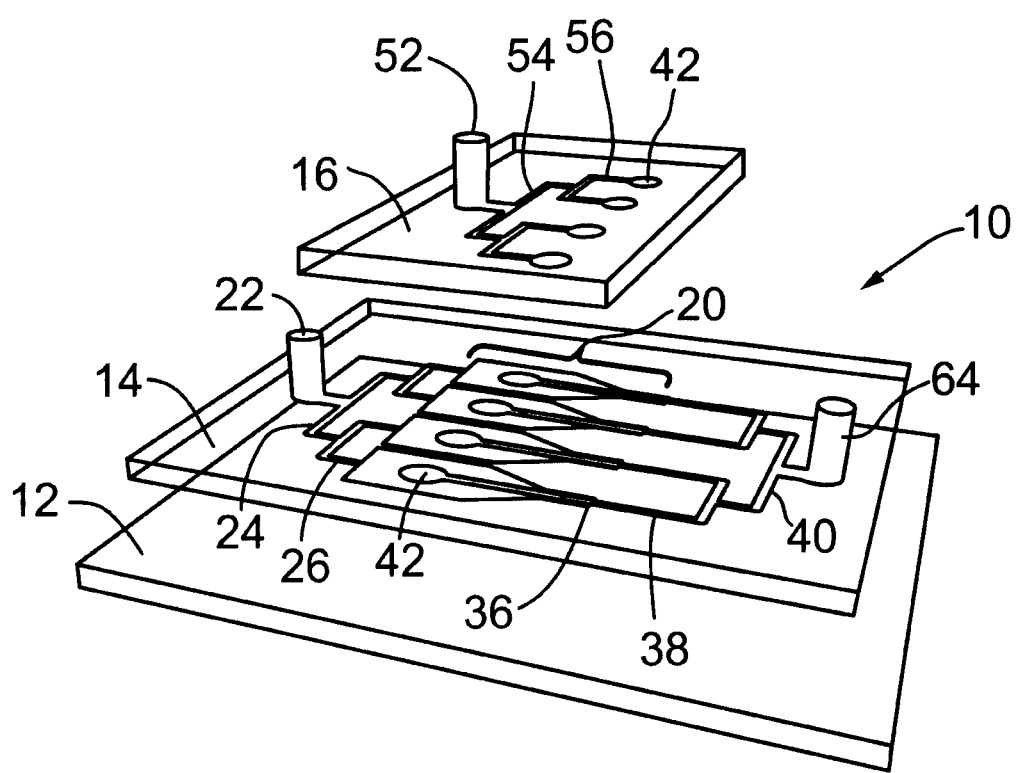
FIG. 3 is a 3D illustration of a microfluidic quadra-droplet generator (QDG).

FIGS. 1 through 8 illustrate a quadra-droplet generator (QDG) used in the present work, shown generally at 10 in FIG. 3. FIG. 1 shows a schematic drawing of an individual planar flow-focusing droplet generator. Two immiscible liquids, a droplet phase A, and a continuous phase B, are supplied to the central channel 30 and side channels 32 of the flow-focusing device (FFD), respectively. The liquids are forced through a narrow orifice 34 in which a thread of liquid A breaks up and releases droplets 62. The separation of the time scales between the slow progression of collapse and the fast equilibration of the interfacial tension and hydrostatic pressure results in the formation of droplets 62 with a narrow size distribution.

FIG. 2 depicts the fluid flow path in a single planar flow-focusing device shown generally at 20. Liquid A enters via opening 42 and travels downstream via the central microchannel 30 through orifice 34 to the outlet microchannels 38. Liquid B enters via side microchannels 26 and travels through microchannel 32 through orifice 34 to the outlet microchannels 38.

FIG. 3 shows a 3D illustration of the quadra-droplet generator 10 (QDG) with four parallel flow-focusing devices 20.

Liquids A and B are supplied to the flow-focusing devices 20 (FFDs) in a manifold fashion through inlets 52 (liquid A) and 22 (liquid B). The bottom component of the device is a planar, non-patterned base sheet 12 having a planar top surface.

Figure 4:
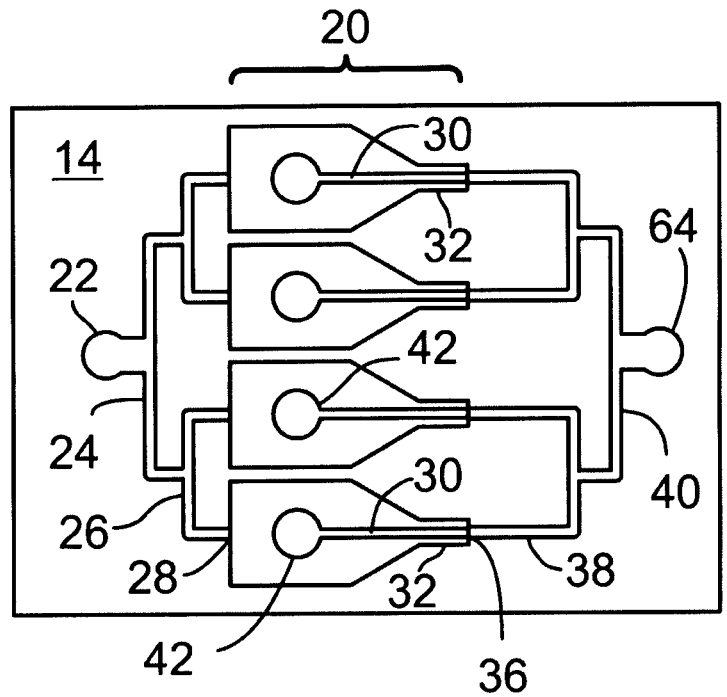
FIG. 4 is a top-view of the geometry of the microchannel relief patterns in the bottom surface of sheet 14.
Figure 5:
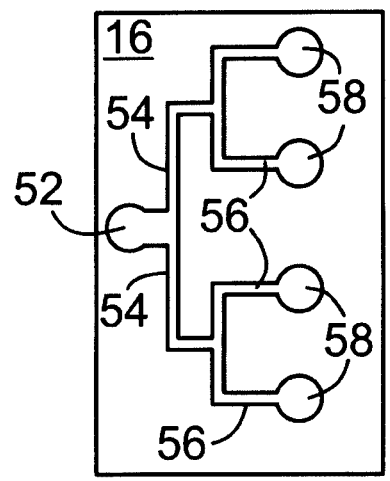
FIG. 5 is a top-view of the geometry of the microchannel relief patterns in the bottom surface of sheet 16.

The intermediate and the top components of the device (sheets 14 and 16, respectively) are patterned, as shown in FIGS. 4 and 5. Particularly, sheet 14 has a relief pattern of four (4) (but it may be a plurality) microfluidic flow-focusing devices 20, each including an inlet 28 and an outlet 36, microchannels 30 and 32, a relief pattern for a first inlet manifold distributor 24 having a plurality of microfluidic flow channels 26 connected to the inlets 28 of the plurality of microfluidic flow-focusing devices 20. The first inlet manifold distributor 24 has a fluid inlet 22. Sheet 14 includes a relief pattern for an outlet manifold distributor 40 connected via relief patterns of microchannels 38 to the outlets 36 of the plurality of microfluidic flow-focusing devices 20. The outlet manifold distributor 40 has a fluid outlet 64. The relief patterns are formed in the bottom surface of sheet 14, and each of the microfluidic flow-focusing devices 20 has an opening 42 in the top surface of sheet 14 in flow communication with microchannel 30 on the interior of the associated microfluidic flow-focusing device 20.

The device includes a third sheet 16 having a relief pattern of a second inlet manifold distributor 54 in a bottom surface of the third sheet 16, with this relief pattern including a plurality of microfluidic flow channels 56 each in communication with a fluid inlet 52 and one of the openings 42 in the top surface of sheet 14 when sheet 16 is assembled on the top surface of sheet 14 with its bottom surface in physical contact with the planar top surface of sheet 14 in a sealing relationship. Assembling sheet 14 on the planar top surface of the base sheet 12 with the bottom surface in physical contact with the planar top surface in sealing relationship forms the plurality of microfluidic flow-focusing devices 20 and the first inlet manifold distributors 24 and outlet manifold distributors 40.

Liquid B is supplied through inlet 22 and is split between four channels 26 of identical width and height and further split between eight channels 32 of identical width and height. Liquid A is injected in inlet 52 and is split between four channels 56 of identical width and height. When the three sheets 12, 14 and 16 are sealed, as shown in FIG. 3, the openings 42 in sheet 14 and 16 are superimposed, so that liquid A enters the microchannels 30 in the intermediate sheet 14. Thus sheet 16 serves as an "adapter," while the generation of droplets occurs between sheets 12 and 14. The droplets produced in the individual flow-focusing devices 20 (FFDs) enter a common downstream channel 38 and exit from the outlet 64. The distribution of sizes of droplets 62 is examined in the downstream channels of individual FFDs 20 and at the exit from the quadra-droplet generator 10.

Figure 6:
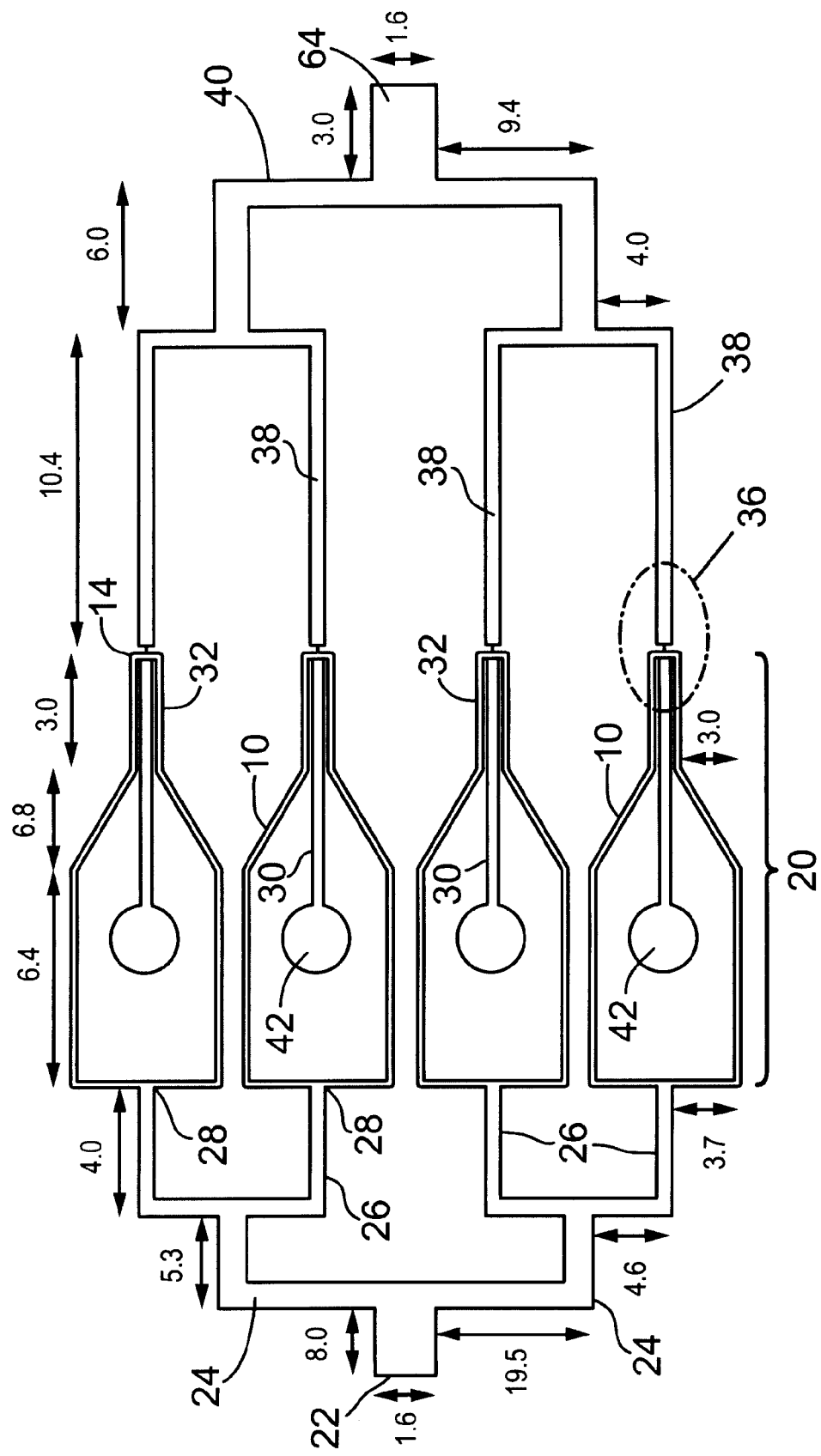
FIG. 6 is a top-view of FIG. 4 showing a non-limiting example of dimensions (in mm) of microchannels in the quadra-droplet generator (QDG) fabricated in sheet 14. In the present non-limiting embodiment, sheet 14 is 5 cm×7.5 cm.
Figure 8:
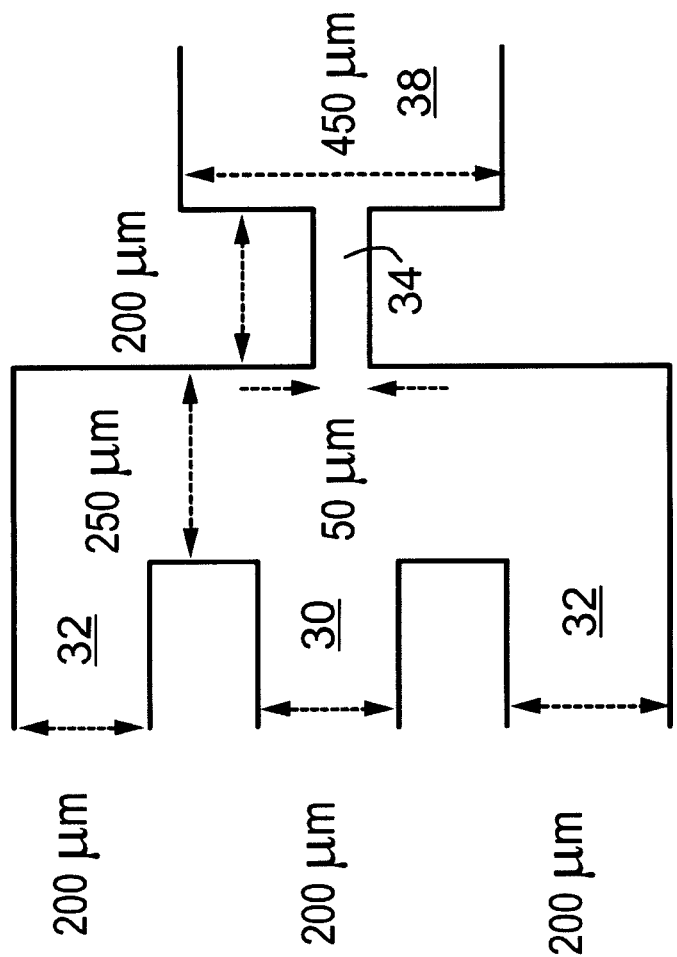
FIG. 8 is a top-view of FIG. 1 showing a non-limiting example of dimensions (in μm) of microchannels in the outlet 36 of the fluid-focusing device in sheet 14.
Figure 7:
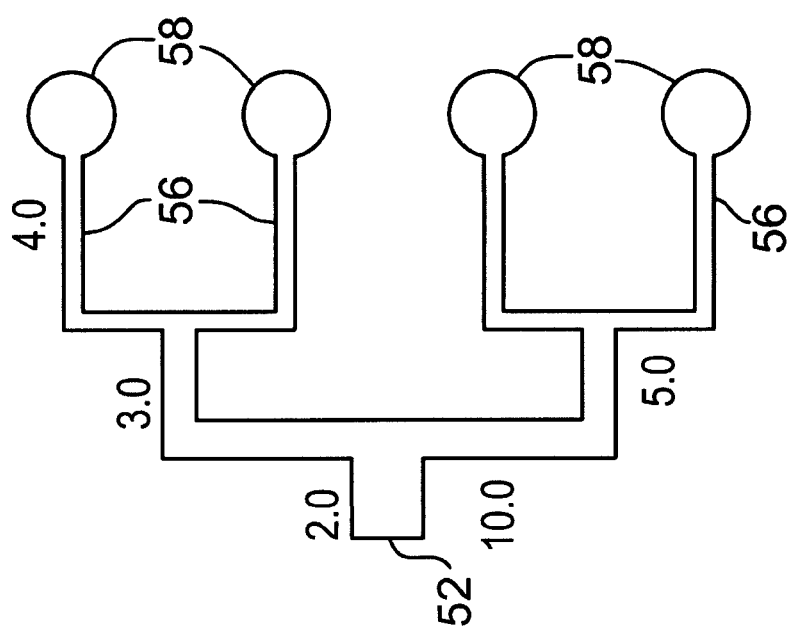
FIG. 7 is a top-view of FIG. 5 showing a non-limiting example of dimensions (in mm) of microchannels in the quadra-droplet generator fabricated in sheet 16. In the present non-limiting embodiment, sheet 16 is 5 cm×3 cm.

FIG. 6 shows a non-limiting example of dimensions of microchannels in the quadra-droplet generator (QDG) fabricated in sheet 14, in millimeters. The width of microchannels 24 and 38 is 800 micrometers, 26, 400 micrometers, 30 and 32, 200 micrometers, and 38, 450 micrometers. These dimensions of disclosed embodiments are merely exemplary, and it should be appreciated that the microchannel widths may vary from about 20 to 1000 micrometers.

It is noted that in FIG. 3 there is shown a single sheet 16 having an inlet manifold distributor 54. It will be appreciated that additional sheet(s) may be included with additional inlet manifolds, and in the case of FIG. 3 if an additional sheet with an inlet manifold is provided, there are holes 42 through the third sheet located at the termination of the microfluidic flow channels 56 in the third sheets which are in registration with the terminations of the microfluidic flow channels 54 in the additional sheet(s). These additional sheet(s) may be useful in some embodiments where mixing, concentration, dilution, or change in composition of droplet phase or continuous phases is needed.

Microfluidic devices were fabricated from poly(dimethylsiloxane) (PDMS) using a soft lithography technique as disclosed in Y. Xia, G. M. Whitesides, Angew. Chem. 110, 568-594 (1998); Y. Xia, G. M. Whitesides, Angew. Chem. Int. Ed. 37, 550-575 (1998); D. C. Duffy, J. C. McDonald, O. J. A. Schueller, G. M. Whitesides Anal. Chem. 70, 4974-4984 (1998). The actual widths of the microchannels, especially the widths of the orifices in the individual flow-focusing devices (FFDs), were measured prior to the emulsification experiments. Herein, we used two types of quadra-droplet generators (QDGs) in which the flow-focusing devices had identical or different widths of the orifice 34.

Figure 9A:
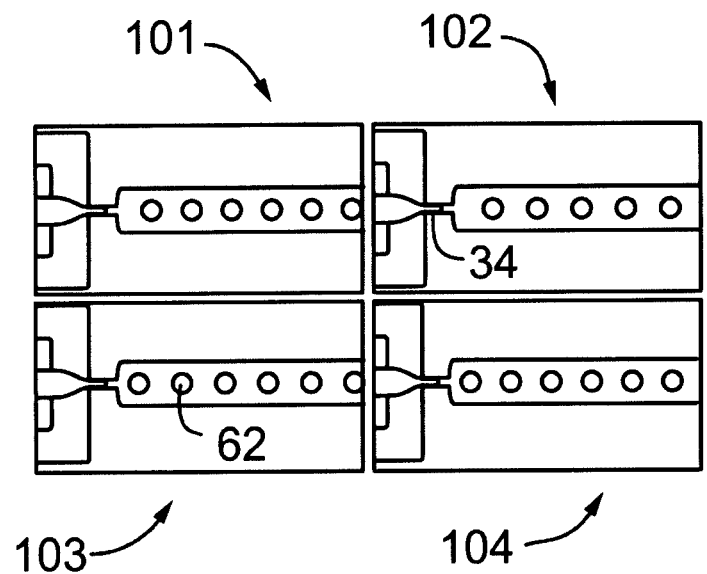
FIGS. 9a and 9b show optical microscopy images of droplets formed in four-flow-focusing devices (FIG. 9a) and collected at the outlet of the quadra-droplet generator (FIG. 9b).
Figure 9B:
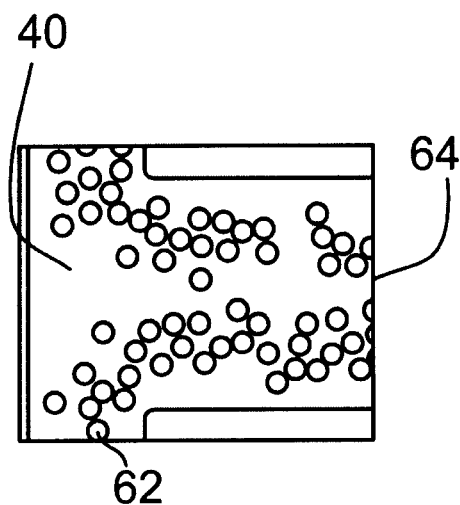

Filtered, deionized water was used as a droplet phase (introduced as liquid A). A 2 wt % solution of a non-ionic surfactant Span 80 in a light mineral oil was used as a continuous phase (introduced as liquid B). Liquids A and B were supplied to the quadra-droplet generator 10 (QDG) using two separate syringe pumps (PHD 2000, Harvard Apparatus, MA). An optical microscope (Olympus BX41) coupled with a CCD camera (Evolution™ VF) was used to acquire images of droplets (FIGS. 9 and 10). The distribution of sizes of droplets was determined by image analysis of the micrographs using a software Image-Pro Plus 5.0.

Typically, we measured the diameters of at least 100 droplets. Polydispersity of droplets was characterized by determining coefficient of variance (CV) of the diameters of droplets (defined as $(\sigma/d_m) \times 100\%$ where $\sigma$ is the standard deviation and $d_m$ is the mean droplet diameter).

Emulsification is performed in a quadra-droplet generator (QDG) with identical flow-focusing devices. FIG. 9a shows typical optical microscopy results of droplets generated in four identical FFDs 20 and FIG. 9b shows droplets collected from the outlet 64 of the quadra-droplet generator 10. The width of the orifices and the height of channels in the FFDs were 50±2 μm and 150±2 μm, respectively. The flow rate of water and oil, introduced liquids A (inlet 52) and B (inlet 22) are 0.02 mL/hr and 1.0 mL/hr, respectively. We varied the flow rate, $Q_A$, of the droplet phase A supplied to inlet 52 from 0.02 to 0.08 milliliters/hour and the flow rate, $Q_B$, of the continuous phase B supplied to inlet 22 from 1.0 to 1.6 milliliters/hour. In this range of flow rates of liquid, the droplets formed via the flow-focusing mechanism, and the formation of large discoid droplets squished between the top and the bottom walls of the microchannels was avoided.

FIGS. 12a and 12b show a typical variation in the diameter, $D_m$, of droplets 62 generated in the individual flow-focusing devices 20 (FFDs), plotted as a function of the flow rate, $Q_A$, of the droplet phase for two different values of $Q_B$. As expected, the size of droplets increased with an increasing value of $Q_A$ and a decreasing value of $Q_B$. More importantly, for each value of $Q_A$ and $Q_B$ a small but finite difference existed in the dimensions of droplets 62 generated in the individual FFDs 20. The difference between the mean diameters of droplets 62 generated in different FFDs 20 was up to 8 μm (for the size of droplets in the range from 80 to 135 μm). This variation did not notably change with the value of $Q_B$.

Because of the small difference between the mean diameters of droplets 62 generated in the individual FFDs, polydispersity of the total population of droplets produced in the multiple droplet generator was approximately 1-2 higher than CV of the droplets generated in the individual combined devices, however, the total value of CV did not exceed 4.0%

(FIGS. 3c and 3d). Polydispersity did not significantly change with increasing flow rates of the liquids We ascribed the broadening in the distribution of sizes of the droplets emulsified in the quadra-droplet generator 10 (QDG) to the weak parametric coupling between the individual droplet generators. Close inspection of images of droplets moving through the downstream channels in the individual FFDs revealed that the difference in distances between the two neighbouring droplets did not exceed 5 μm whereas for the droplets produced in the different FFDs the variation in the spacing was up to 20 μm. This result suggested that droplets in the parallel FFDs were generated at varying frequencies, i.e., emulsification was not completely synchronized. This effect resulted in the broadening of polydispersity of the total population of droplets.

To rule out a possible effect of occasional flow instabilities on size distribution of droplets obtained in the QDG, we examined polydispersity of droplets produced in four independent FFDs 20 that were not combined in the QDG. The increase in CV of the total population of droplets did not exceed 0.7% and in most cases, it did not exceed 0.5%, in comparison with the value of CV of the droplets obtained in the individual FFDs.

TABLE 1

Diameters of droplets and coefficients of variance (CV) of droplets obtained in four individual microfluidic FFDs

|  | FFD 101 | FFD 102 | FFD 103 | FFD 104 | Total population of droplets | $Q_B$ (mL/hr) | $Q_A$ (mL/hr) |
|---|---|---|---|---|---|---|---|
| Width of orifice (μm) | 50.7 ± 1.0 | 50.8 ± 1.0 | 48 ± 1.0 | 48.8 ± 1.0 | | | |
| Mean droplet diameter (μm)/CV(%) | 105.5/1.4 | 103.2/1.5 | 102.2/1.4 | 104.1/1.2 | 103.8 1.7 | | 0.005 |
| | 104.3/1.3 | 104.6/1.3 | 103.1/1.2 | 103.9/1.3 | 104.0 1.5 | 0.25 | (T1) |
| | 105.0/1.3 | 103.6/1.4 | 102.9/1.5 | 102.2/1.6 | 103.4 1.9 | | (T2) |
| | | | | | | | (T3) |
| | 112.1/1.3 | 113.0/1.0 | 112.9/1.2 | 111.2/1.4 | 112.3 1.5 | | 0.0125 |
| | 112.8/1.6 | 114.2/1.1 | 112.1/1.5 | 110.6/1.1 | 112.2 1.6 | 0.25 | (T1) |
| | 114.2/1.5 | 112.6/1.3 | 110.6/1.5 | 114.3/1.2 | 112.9 1.7 | | (T2) |
| | | | | | | | (T3) |
| | 132.6/1.1 | 132.4/0.9 | 129.7/1.0 | 130.5/1.1 | 131.3 1.6 | | 0.020 |
| | 130.6/1.3 | 135.1/1.0 | 130.6/0.9 | 133.2/0.9 | 132.4 1.4 | 0.25 | (T1) |
| | 131.5/1.1 | 134.3/1.2 | 132.9/0.9 | 130.6/1.1 | 132.3 1.6 | | (T2) |
| | | | | | | | (T3) |
| | 91.9/1.1 | 93.8/1.4 | 95.3/1.4 | 93.3/1.6 | 93.6 1.9 | | 0.005 |
| | 91.0/1.2 | 92.6/1.6 | 93.6/1.5 | 92.6/1.2 | 92.5 1.7 | 0.30 | (T1) |
| | 90.5/1.4 | 93.5/1.5 | 93.1/1.1 | 93.7/1.2 | 92.7 1.6 | | (T2) |
| | | | | | | | (T3) |
| | 107.2/1.3 | 109.3/1.4 | 107.0/1.3 | 106.5/1.5 | 107.5 1.6 | | 0.005 |
| | 108.2/1.5 | 108.6/1.2 | 107.9/1.2 | 106.6/1.4 | 107.8 1.8 | 0.30 | (T1) |
| | 106.9/1.2 | 109.9/1.4 | 105.4/1.4 | 104.9/1.1 | 106.8 2.0 | | (T2) |
| | | | | | | | (T3) |
| | 116.7/1.1 | 118.4/1.0 | 115.9/1.1 | 116.7/1.2 | 116.9 1.7 | | 0.0125 |
| | 116.2/1.4 | 116.5/1.2 | 116.8/1.4 | 115.5/1.1 | 116.3 1.6 | 0.30 | (T1) |
| | 115.2/1.3 | 117.2/1.1 | 118.3/1.5 | 114.3/1.5 | 116.3 1.8 | | (T2) |
| | | | | | | | (T3) |
| | 81.1/1.5 | 82.3/1.6 | 80.4/1.7 | 80.8/1.4 | 81.2 1.9 | | 0.005 |
| | 80.6/1.4 | 82.9/1.4 | 80.1/1.5 | 79.3/1.6 | 80.7 2.0 | 0.35 | (T1) |
| | 82.0 1.6 | 81.6/1.3 | 81.6/1.2 | 79.0/1.7 | 81.1 1.9 | | (T2) |
| | | | | | | | (T3) |
| | 96.9/1.3 | 98.1/1.5 | 98.5/1.0 | 97.2/1.5 | 97.7 1.6 | | 0.0125 |
| | 95.3/1.2 | 97.5/1.4 | 97.6/1.5 | 98.9/1.2 | 97.3 1.7 | 0.35 | (T1) |
| | 97.2/1.5 | 97.0/1.6 | 96.9/1.4 | 97.7/1.4 | 97.2 1.7 | | (T2) |
| | | | | | | | (T3) |
| | 105.6/1.5 | 107.2/1.3 | 105.8/1.3 | 106.3/1.4 | 106.2 1.8 | | 0.020 |
| | 105.8/1.4 | 106.4/1.6 | 106.8/1.2 | 104.9/1.6 | 106.0 1.9 | 0.35 | (T1) |
| | 104.3/1.2 | 105.9/1.5 | 108.0/1.6 | 103.7/1.6 | 105.5 2.0 | | (T2) |
| | | | | | | | (T3) |
| | 73.5/1.7 | 76.5/1.6 | 74.2/1.8 | 73.1/1.6 | 74.3 2.1 | | 0.005 |
| | 72.4/1.6 | 75.5/1.6 | 70.6/1.2 | 71.2/1.4 | 72.4 1.8 | 0.40 | (T1) |
| | 73.9/1.7 | 74.9/1.7 | 72.6/1.3 | 70.6/1.5 | 73.0 1.9 | | (T2) |
| | | | | | | | (T3) |
| | 83.5/1.8 | 85.6/1.6 | 83.5/1.5 | 86./1.4 | 84.7 1.7 | | 0.0125 |
| | 82.1 1.6 | 86.3/1.5 | 85.3/1.1 | 85.5/1.2 | 84.8 1.7 | 0.40 | (T1) |
| | 83.1/1.4 | 84.9/1.6 | 86.3/1.6 | 84.2/1.5 | 84.6 1.9 | | (T2) |
| | | | | | | | (T3) |
| | 92.9/1.6 | 94.9/1.6 | 91.9/1.2 | 93.7/1.4 | 93.4 1.8 | | 0.020 |
| | 91.3/1.6 | 93.0/1.3 | 93.1/1.1 | 91.1/1.4 | 92.1 1.8 | 0.40 | (T1) |
| | 90.8/1.5 | 94.1/1.6 | 92.7/1.5 | 90.6/1.5 | 92.1 1.8 | | (T2) |
| | | | | | | | (T3) |

The data denoted as T1, T2 and T3 correspond to three experiments conducted for the same values of $Q_A$ and $Q_B$.

Furthermore, we studied reproducible formation of droplets in the QDG 10 by examining the distribution in sizes of droplets obtained with a one-day time interval. FIGS. 13a, 13b shows a representative change in the mean diameter of droplets obtained in FFD 102, plotted as a function of the flow rate of the droplet phase, $Q_A$. In the same range of flow rates as in FIG. 12, the difference in mean diameter of droplets formed in the successive emulsification experiments was from 1 to 5 µm. FIGS. 13c, 13d shows that the value of the CV of droplets generated in each emulsification experiment was in the range from 1.6 to 2.5%, while the CV of the entire collection of droplets produced in three experiments did not exceed 3.0%.

We thus conclude that in the range of flow rates of liquids studied, weak coupling between parallel FFDs integrated in the multiple droplet generator broadened the polydispersity of droplets; however, the droplets generated in the multiple droplet generator could be defined as "monodispersed" (According to the standards of the National Institute of Standards and Technology (NIST): "a particle distribution may be considered monodisperse if at least 90% of the distribution lies within 5% of the median size" (Particle Size Characterization, Special Publication 960-961, January 2001). In the second series of experiments, emulsification was carried out in a quadra-droplet generator integrating flow-focusing devices with distinct geometries. The width of the orifice in the individual FFDs was varied from 40 to 75 µm (all other dimensions of the microchannels were kept identical). Here, our objective was to achieve simultaneous formation of droplets with different volumes.

Figure 10A:
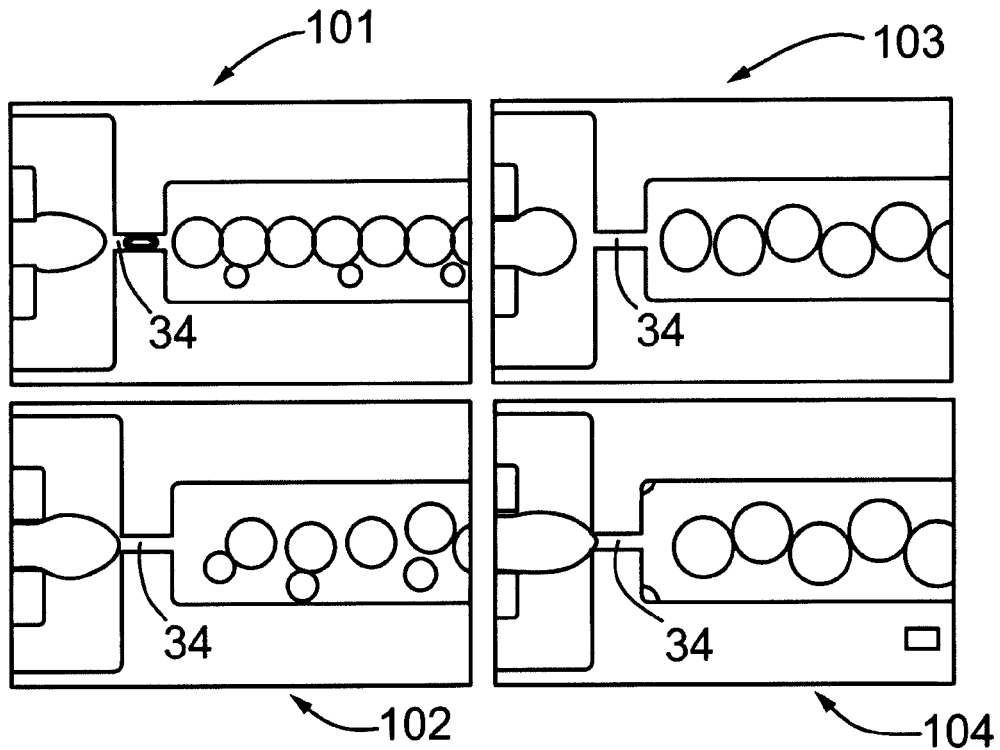
FIGS. 10a, 10b show optical microscopy images of droplets formed in a four FFDs with the mean orifice width: 41±1 μm (FFD 101); 50±1 μm (FFD 102); 61±1 μm (FFD 103), and 75±1 μm (FFD 104). In 10a, $Q_A$=0.2 mL/hr and $Q_B$=1.0 mL/hr; in 10*b*, $Q_A$=0.2 mL/hr and $Q_B$=2.0 mL/hr. The height of quadra-droplet generator (QDG) is 150±2 μm.
Figure 10B:
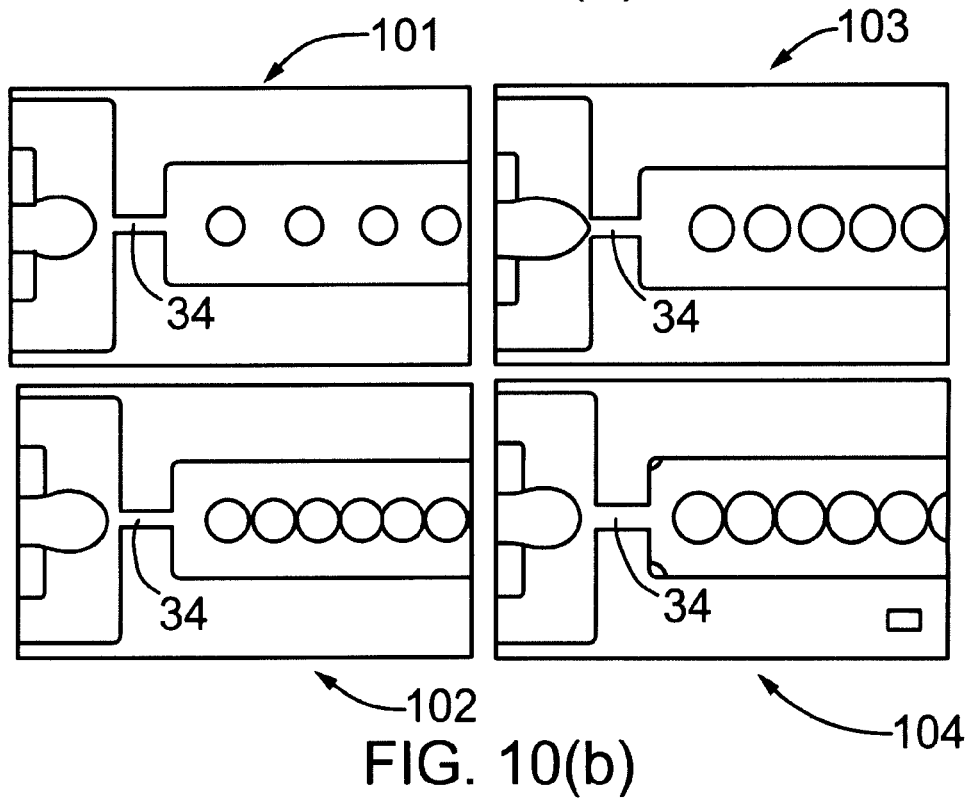

We used the values of flow rates of liquids, $Q_B/Q_A$, yielding droplets in the flow-focusing regime and obtained droplets with different sizes and varying size distributions, as illustrated in FIG. 10a and quantified in Table 1. At low values of $Q_B/Q_A$, emulsification in the FFDs with wide orifices (FFD 103 and FFD 104) generated a single population of monodispersed droplets whereas two populations of droplets, each with CV≈2% were obtained in the FFDs with narrower orifices. With increasing values of $Q_B/Q_A$ this trend narrowed to FFD 101 and for $8<Q_B/Q_A<10$ all FFDs produced a single population of droplets with polydispersity of 2-3% (FIG. 5b). The mean diameter of droplets decreased with a decreasing width of the orifice. At $Q_B/Q_A \geq 40$, the stream of the droplet phase did not enter the orifice with the smallest width of 40 µm.

FFDs with different geometries. The ratio between the volumes of droplets generated in the individual parallel FFDs was found by analyzing optical microscopy images. With an increasing value of $Q_B/Q_A$ the ratio of volumes of droplets changed, as shown in Table 1, right column. For example, when $Q_B/Q_A$ doubled from 5 to 10, the ratio of volumes of droplets generated in FFD 104 and FFD 101 increased from 1.68 to 3.89, i.e., increased by a factor of 2.32.

FIG. 14 shows the effect of flow rate ratio $Q_B/Q_A$ on the volume fractions of droplets produced in parallel FFDs. The volume fraction of droplets formed in an individual FFD was defined as $R_i=(V_i/V_{tot})$ where $V_i$ is the total volume of droplets produced per unit time in individual FFD and $V_{tot}$ is the total volume of droplets obtained in the quadra-droplet generator. Dashed lines in FIG. 15 show the ratio of volume of an orifice 34 in an individual FFD 20 to the total volume of orifices 34 in the quadra-droplet generator 10 (QDG). For ratios of $Q_B/Q_A>6$, the value of $R_i$ for FFD 104 increased, the value of $R_i$ for FFD 101 decreased, and the values of $R_i$ for FFD 102 and FFD 103 did not change. These effects implied that with an increasing ratio of flow rates of liquids, the FFD with the widest orifice consumed an increasing volume of the droplet phase, at the expense of the liquid entering the FFD with the narrowest orifice. We attribute the re-distribution of droplet size between the FFDs to the difference in hydrodynamic path resistances to the liquids in the devices with different geometry, in addition to the non-synchronized break up of the liquid threads (see V. Barbier, H. Willaime, and P. Tabeling, Phys. Rev. E, 74, 046306 (2006)).

FIG. 15 shows the effect of the flow-rate ratio $Q_B/Q_A$ on the volume fractions of droplets produced in parallel FFDs. The variation in experimental volume fraction $R_i$ of droplets generated in FFDs with different geometry is plotted as a function of the flow rate ratio [$Q_B/Q_A$] of continuous to droplet phases for FFD 101 (■), FFD 102 (Δ), FFD 103 (◊), and FFD 104 (□). The horizontal dashed lines represent the volume fraction of an orifice in an individual FFD to the total volume of orifices in the QDG (bottom to top lines correspond to FFD 101 to FFD 104, respectively).

FIG. 16 shows that the dimensions of droplets produced in the integrated droplet generator comprising sixteen individual droplet generators. The diameters of droplets show weak correlation with the width and the height of the orifices of the individual droplet generators.

FIG. 11 shows a functional schematic of a microfluidic polymerization reactor, shown generally at 70. Pumps 72 and 74 propel continuous phase fluid B and droplet phase fluid A respectively to inlets 76 which are in fluid communication with orifice 78 via microfluidic flow channels 84, wherein

TABLE 2

Mean diameter ($d_m$) of droplets formed in individual droplet generators and of the total population of droplets generated in quadra-droplet generator.

|  | $Q_B$ (mL/hr) | $Q_B/Q_A$* | FFD 101 | FFD 102 | FFD 103 | FFD 104 | $V_1/V_2/V_3/V_4$** |
|---|---|---|---|---|---|---|---|
| Orifice width (µm) |  |  | 41 | 50 | 61 | 75 | 1/1.22/1.49/1.83 |
| Mean droplet diameter ($d_m$) (µm) | 1 | 5 | 144 + 63 | 166 + 83 | 170 | 188 | 1/1.30/1.34/1.68 |
|  | 1.2 | 6 | 136 + 41 | 152 | 159 | 180 | 1/1.42/1.57/1.83 |
|  | 1.4 | 7 | 130 + 29 | 142 | 147 | 174 | 1/1.56/1.73/2.79 |
|  | 1.6 | 8 | 120 | 139 | 143 | 166 | 1/1.87/2.03/2.92 |
|  | 1.8 | 9 | 115 | 132 | 137 | 161 | 1/2.27/2.45/3.82 |
|  | 2.0 | 10 | 108 | 122 | 130 | 152 | 1/2.40/2.71/3.87 |

*$Q_A$ = 0.2 mL/hr.
**$V_1/V_2/V_3/V_4$ is the mean volume ratio of droplets formed in four parallel FFDs, normalized by $V_1$.

We note that for the parallel FFDs with distinct geometries, coupling was significantly stronger than in the FFDs with identical design. Close inspection of the optical microscopy images revealed that the difference in spacing between the droplets generated in each FFD was up to 20 µm, in comparison with 1-5 µm measured for the FFDs with similar geometry. To elucidate the role of geometric coupling, we examined the ratio of volumes of droplets generated in the parallel droplets 62 of fluid A suspended in fluid B are formed. Orifice 78 is in flow communication with polymerization compartment 80 for in-chip polymerization, as described herebelow. In the polymerization compartment 80, the droplets 62 undergo solidification and are collected at the first outlet 82. If solidification is insufficient, the droplets can be transferred via the extension tube 88 to the off-chip polymerization compartment 90 where they undergo complete solidification and are collected at the second outlet 92.

Droplets produced in the multiple parallel droplet generators may be polymerized induced by various types of polymerization agents to give different types of polymerizations, including photoinitiated free-radical polymerization.

For polymers undergoing fast polymerization, e.g. multifunctional acrylates, continuous polymerization is conducted in situ in the polymerization compartment 80, as shown in FIG. 11 at the outlet of the flow focusing device for an individual microfluidic reactor. For monomers undergoing slow polymerization such as styrene, in situ pre-polymerization is followed by post-polymerization in the off-chip polymerization compartment 90 fabricated in glass (FIG. 11). The pre-polymerization step is used to preserve a narrow size distribution of particles. Furthermore, the rate of polymerization is increased by using a mixed initiator approach developed in the applicant's group: a monomer is mixed with a thermo- and photoinitiator. Exothermic photopolymerization generates heat which triggers thermoinitiated polymerization thereby increasing monomer conversion.

The various polymerization agents induce any one or combination of free-radical, polymerization including reversible addition-fragmentation chain transfer polymerization (RAFT) and atom transfer radical polymerization (ATRP)), ionic polymerizations or polycondensation. The polymerization may be induced or triggered by light so that the resulting polymerization process is thus photoinitiated. The droplet phase A contains one or more polymerization agents such that the emulsion droplets contain one or more polymerization agents. Alternatively the liquid phase B may contain one or more polymerization agents which diffuse into the emulsion droplets such that the emulsion droplets contain one or more polymerization agents.

The polymerized particles so produced may be substantially rigid particles. Alternatively the droplet phase A may contain prepolymer agents such that the emulsion droplets contain prepolymer agents. These prepolymer agents localized in the emulsion droplets transform the emulsion droplets into a gel and yields microgel particles.

It is noted that each droplet can be used for solution polymerization, i.e., the droplets would not be transformed into rigid beads. In this embodiment the droplets may act as pico or nanoreactors for solution polymerization.

We designed and implemented a multiple droplet generator integrating four parallel flow-focusing devices (FFDs) with identical or different geometries. Emulsification conducted in the droplet generator combining identical FFDs shows that weak coupling between the devices led to the moderate broadening in their size distribution, yet, the droplets produced in the QDG could be characterized as "monodispersed". Emulsification in the droplet generator combining parallel FFDs with distinct geometries occurred with strong coupling and produced droplets with varying size and size distributions.

As used herein, the terms "comprises", "comprising", "including" and "includes" are to be construed as being inclusive and open ended, and not exclusive. Specifically, when used in this specification including claims, the terms "comprises", "comprising", "including" and "includes" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A multiple microfluidic reactor for scaled up synthesis in emulsion droplets, comprising:
    a) a first base sheet having a planar top surface;
    b) a second sheet having:
        i) relief patterns of a plurality of microfluidic flow-focusing devices, each including an inlet and an outlet,
        ii) a relief pattern for a first inlet manifold distributor having a fluid inlet and microfluidic flow channels each in fluid communication with the first manifold fluid inlet and the inlets of the plurality of microfluidic flow-focusing devices,
        iii) a relief pattern for an outlet manifold distributor connected to the outlets of the plurality of microfluidic flow-focusing devices, the outlet manifold distributor having a fluid outlet,
        iv) said relief patterns being formed in a bottom surface of the second sheet,
        v) each of said plurality of microfluidic flow-focusing devices having an opening in the top surface of the second sheet in flow communication with an interior of the associated microfluidic flow-focusing device; and
    c) at least a third sheet having a relief pattern of a second inlet manifold distributor in a bottom surface of said third sheet, the relief pattern of the second inlet manifold distributor including an inlet and a plurality of microfluidic flow channels each in fluid communication with the second manifold fluid inlet and with one of said openings in the top surface of the second sheet when said third sheet is assembled on a top surface of the second sheet with the bottom surface in physical contact with the planar top surface in sealing relationship, and wherein assembling the second sheet on the planar top surface of the first base sheet with the bottom surface in physical contact with the planar top surface in sealing relationship forms the plurality of microfluidic flow-focusing devices and the first inlet and outlet manifold distributors; and
    d) wherein in operation two immiscible liquids, a droplet phase, A, and a continuous phase, B, are supplied to the first manifold fluid inlet and to the second manifold fluid inlet respectively, and wherein said two immiscible liquids A and B are forced through a narrow orifice in which a thread of liquid A breaks up and produces emulsion droplets.

2. The multiple microfluidic reactor according to claim 1 wherein said first base sheet, said second sheet and said third sheet are made of poly(dimethylsiloxane) (PDMS).

3. The multiple microfluidic reactor according to claim 1 wherein said second sheet includes apertures right though the second sheet at a location corresponding to a termination of each microfluidic flow channel where each microfluidic flow channel communicates with the openings in the top surface of the second sheet when said third sheet is assembled on the top surface of the second sheet, including at least one additional third sheet having a relief pattern of at least one additional third inlet manifold distributor in a bottom surface of said at least one additional third sheet, the relief pattern of the at least one additional third inlet manifold distributor including a plurality of microfluidic flow channels each in communication with an at least one additional third manifold fluid inlet and one of said openings in the top surface of the second sheet wherein said at least one additional third sheet is assembled on a top surface of the second sheet with the bottom surface in physical contact with the planar top surface in sealing relationship, and wherein assembling the second sheet on the planar top surface of the first base sheet with the bottom surface in physical contact with the planar top surface in sealing relationship forms the plurality of microfluidic flow-focusing devices and the first inlet and outlet manifold distributors.

4. The multiple microfluidic reactor according to claim 1 wherein said fluid outlet in said manifold distributor on the second sheet is connected to a polymerization compartment configured for polymerization of said emulsion droplets.

5. The multiple microfluidic reactor according to claim 4 wherein said polymerization compartment is an on-chip polymerization compartment, and wherein an outlet of said on-chip polymerization compartment is in flow communication with an extension tube, and wherein said extension tube is in flow communication with an off-chip polymerization compartment for post-polymerization of droplets pre-polymerized in said on-chip polymerization compartment.

6. The multiple microfluidic reactor according to claim 5 further comprising a particle collector located at an outlet of said off-chip polymerization compartment.

7. A method for producing emulsion droplets, comprising the steps of:
  a) providing a multiple microfluidic reactor for scaled up synthesis in emulsion droplets, comprising:
    i) a first base sheet having a planar top surface;
    ii) a second sheet having relief patterns of a plurality of microfluidic flow-focusing devices, each including an inlet and an outlet, a relief pattern for a first inlet manifold distributor having a fluid inlet and microfluidic flow channels each in communication with the first manifold fluid inlet and the inlets of the plurality of microfluidic flow-focusing devices, the first inlet manifold distributor having a fluid inlet, a relief pattern for an outlet manifold distributor connected to the outlets of the plurality of microfluidic flow-focusing devices, the outlet manifold distributor having a fluid outlet, said relief patterns being formed in a bottom surface of the second sheet, each of said plurality of microfluidic flow-focusing devices having an opening in the top surface of the second sheet in flow communication with an interior of the associated microfluidic flow-focusing device; and
    iii) at least a third sheet having a relief pattern of a second inlet manifold distributor in a bottom surface of said third sheet, the relief pattern of the second inlet manifold distributor including a plurality of microfluidic flow channels each in fluid communication with a second manifold fluid inlet and one of said openings in the top surface of the second sheet when said third sheet is assembled on a top surface of the second sheet with the bottom surface in physical contact with the planar top surface in sealing relationship, and wherein assembling the second sheet on the planar top surface of the first base sheet with the bottom surface in physical contact with the planar top surface in sealing relationship forms the plurality of microfluidic flow-focusing devices and the first inlet and outlet manifold distributors; and
  b) supplying at least two immiscible liquids, a droplet phase, A, and a continuous phase, B, to the first manifold fluid inlet and to the second manifold fluid inlet respectively, and wherein said two immiscible liquids A and B are forced through a narrow orifice in which a thread of liquid A breaks up and produces emulsion droplets.

8. The method according to claim 7 wherein said first base sheet, said a second sheet and said third sheet are made of poly(dimethylsiloxane) (PDMS).

9. The method according to claim 7 wherein said second sheet includes apertures right though the second sheet at a location corresponding to a termination of each microfluidic flow channel where each microfluidic flow channel communicates with the openings in the top surface of the second sheet when said third sheet is assembled on the top surface of the second sheet, including at least one additional third sheet having a relief pattern of at least one additional inlet manifold distributor in a bottom surface of said at least one additional third sheet, the relief pattern of the at least one additional third inlet manifold distributor including a plurality of microfluidic flow channels each in communication with an at least one additional third manifold fluid inlet and one of said openings in the top surface of the second sheet wherein said at least one additional third sheet is assembled on a top surface of the second sheet with the bottom surface in physical contact with the planar top surface in sealing relationship, and wherein assembling the second sheet on the planar top surface of the first base sheet with the bottom surface in physical contact with the planar top surface in sealing relationship forms the plurality of microfluidic flow-focusing devices and the first inlet and outlet manifold distributors.

10. The method according to claim 7 wherein said fluid outlet in said outlet manifold distributor in said second sheet is in flow communication with a polymerization compartment, said method further comprising flowing said emulsion droplets through said polymerization compartment and exposing said emulsion droplets to a first polymerization agent or polymerization initiator for at least initiating the polymerization of the emulsion droplets.

11. The method according to claim 10 wherein said first polymerization agent induces any one or combination of free-radical polymerization including reversible addition-fragmentation chain transfer polymerization (RAFT) and atom transfer radical polymerization (ATRP), ionic polymerizations or polycondensation.

12. The method according to claim 10 wherein said polymerization is initiated by light.

13. The method according to claim 10 in which the droplet phase, A, contains one or more polymerization agents such that the emulsion droplets contain one or more polymerization agents.

14. The method according to claim 10 in which the polymerization of the emulsion droplets produces particles that are substantially rigid particles.

15. The method according to claim 10 in which the droplet phase, A, contains prepolymer agents such that the emulsion droplets contain prepolymer agents.

16. The method according to claim 15 in which the prepolymer agent localized in the emulsion droplets transforms said emulsion droplets into a gel and yields microgel particles.

17. The method according to claim 10 wherein said polymerization compartment is an on-chip polymerization compartment, and wherein an outlet of said on-chip polymerization compartment is in flow communication with an off-chip polymerization compartment, and wherein said emulsion droplets are pre-polymerized in said on-chip polymerization compartment to produce pre-polymerized droplets, said method further comprising flowing said pre-polymerized droplets through said off-chip polymerization compartment and post-polymerizing said pre-polymerized droplets in said off-chip polymerization compartment.

18. The method according to claim 17 wherein said emulsion droplets are flowed through said on-chip polymerization compartment a rate such that upon exposure to said polymerization agent they are pre-polymerized to form a polymerized outer shell, and wherein said pre-polymerized droplets are flowed through said off-chip polymerization compartment at a selected rate and exposed to a second polymerizing agent to completely polymerize the pre-polymerized droplets into particles.

* * * * *